US012373095B1

(12) United States Patent
Sensarn et al.

(10) Patent No.: US 12,373,095 B1
(45) Date of Patent: Jul. 29, 2025

(54) MOTION TRACKING AND IMAGE CAPTURING USING STYLUS DEVICES

(71) Applicant: Amazon Technologies, Inc., Seattle, WA (US)

(72) Inventors: Steven Sensarn, Milpitas, CA (US); Miro Yakov Shverdin, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/622,007

(22) Filed: Mar. 29, 2024

(51) Int. Cl.
| | |
|---|---|
| *G06F 3/03* | (2006.01) |
| *G06F 3/0354* | (2013.01) |
| *G06F 3/042* | (2006.01) |
| *G06F 3/04883* | (2022.01) |

(52) U.S. Cl.
CPC ...... *G06F 3/04883* (2013.01); *G06F 3/03542* (2013.01); *G06F 3/03545* (2013.01); *G06F 3/042* (2013.01)

(58) Field of Classification Search
CPC ............ G06F 3/03542; G06F 3/03545; G06F 3/0346; G06F 3/0416; G06F 21/83; G06F 21/36; G06F 3/0412; G06F 2203/04108; G06F 2203/04205; G06F 3/04883; G06F 3/03; G06V 30/228
See application file for complete search history.

(56) References Cited

U.S. PATENT DOCUMENTS

| | | | | |
|---|---|---|---|---|
| 6,046,733 | A  * | 4/2000 | Challener | G06F 3/03545 |
| | | | | 178/18.11 |
| 6,498,604 | B1 * | 12/2002 | Jensen | G06F 3/0312 |
| | | | | 345/166 |
| 6,897,854 | B2 * | 5/2005 | Cho | G06F 3/03545 |
| | | | | 345/173 |
| 9,329,703 | B2 * | 5/2016 | Falkenburg | G06F 3/0346 |
| 9,921,684 | B2 * | 3/2018 | Falkenburg | G06F 3/0346 |
| 11,644,906 | B2 * | 5/2023 | Hwang | H04W 4/80 |
| | | | | 345/156 |
| 2002/0148655 | A1* | 10/2002 | Cho | G06F 3/03542 |
| | | | | 178/18.09 |
| 2012/0331546 | A1* | 12/2012 | Falkenburg | G06T 11/001 |
| | | | | 726/16 |
| 2016/0342228 | A1* | 11/2016 | Boulanger | G06F 3/041 |
| 2022/0091684 | A1* | 3/2022 | Hwang | G06F 3/038 |

OTHER PUBLICATIONS

"3D Micro-Motion Analysis Using Speckle Imaging." Wision Lab Web, wisionlab.com/project/colux/. Accessed Apr. 16, 2024.
(Continued)

*Primary Examiner* — Olga V Merkoulova
(74) *Attorney, Agent, or Firm* — Pierce Atwood LLP

(57) ABSTRACT

Systems and methods for motion tracking and image capture using a stylus device are described. Example embodiments involve a stylus device outputting/emitting light on a surface and receiving backscattered light at an event sensor of the stylus device. The event sensor may generate event data based in part on intensity of the received backscattered light. The stylus device may perform a motion tracking and/or image capture operation based on the event data.

20 Claims, 15 Drawing Sheets

(56) References Cited

OTHER PUBLICATIONS

Luthi, et al., "DeltaPen: A Device with Integrated High-Precision Translation and Rotation Sensing on Passive Surfaces", ACM UIST, 2022, p. 1-12.
Adonit.com. "Adonit Ink-M." Adonit, www.adonit.net/products/ink-m. Accessed Apr. 16, 2024.
Ge, et al., "Lens-free motion analysis via neuromorphic laser speckle imaging", Opt. Express, vol. 30, No. 2, Jan. 17, 2022, p. 2206-2218.
Synsense.ai, "Speck", SynSense, https://www.synsense.ai/products/speck-2/. Accessed Apr. 16, 2024.

\* cited by examiner

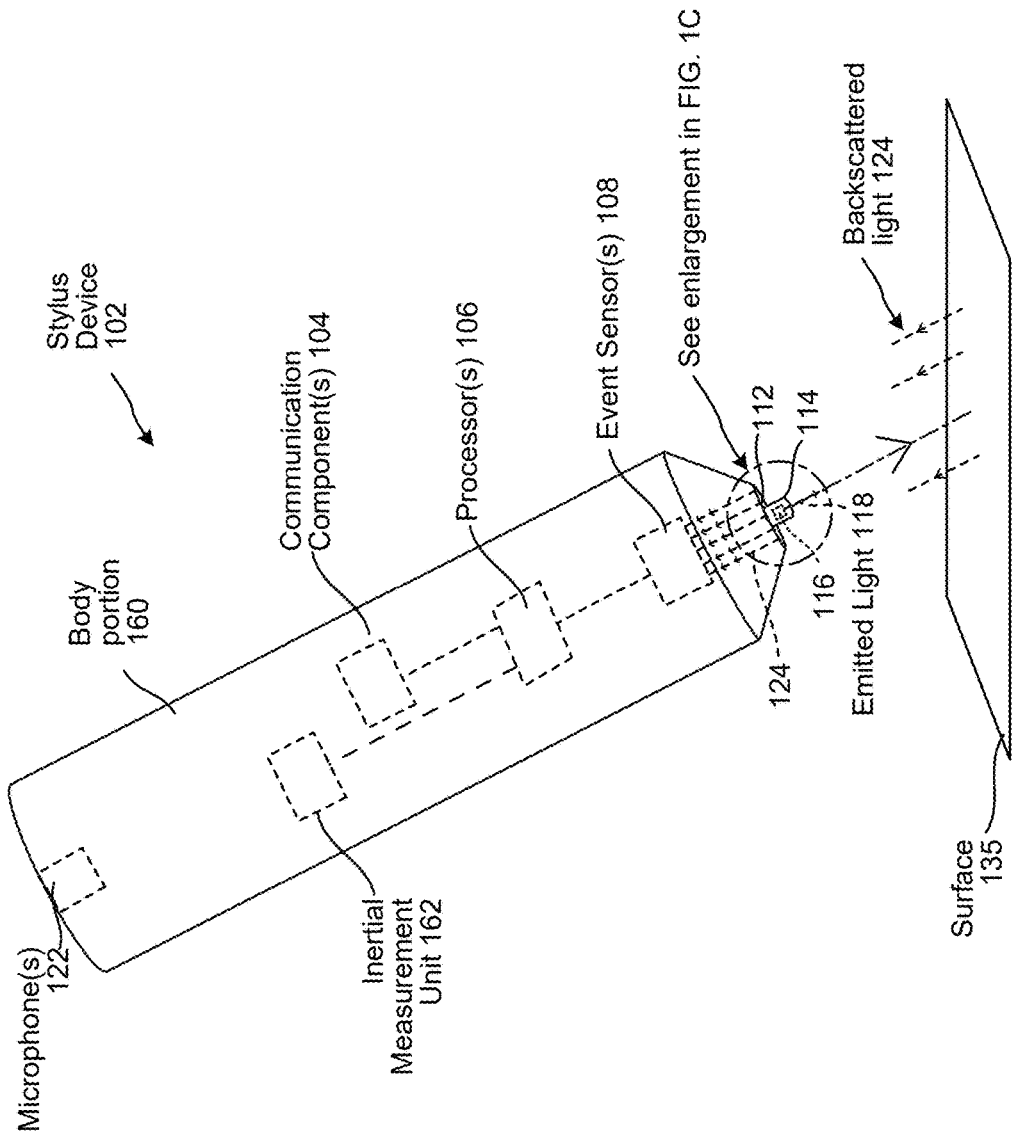

FIG. 2
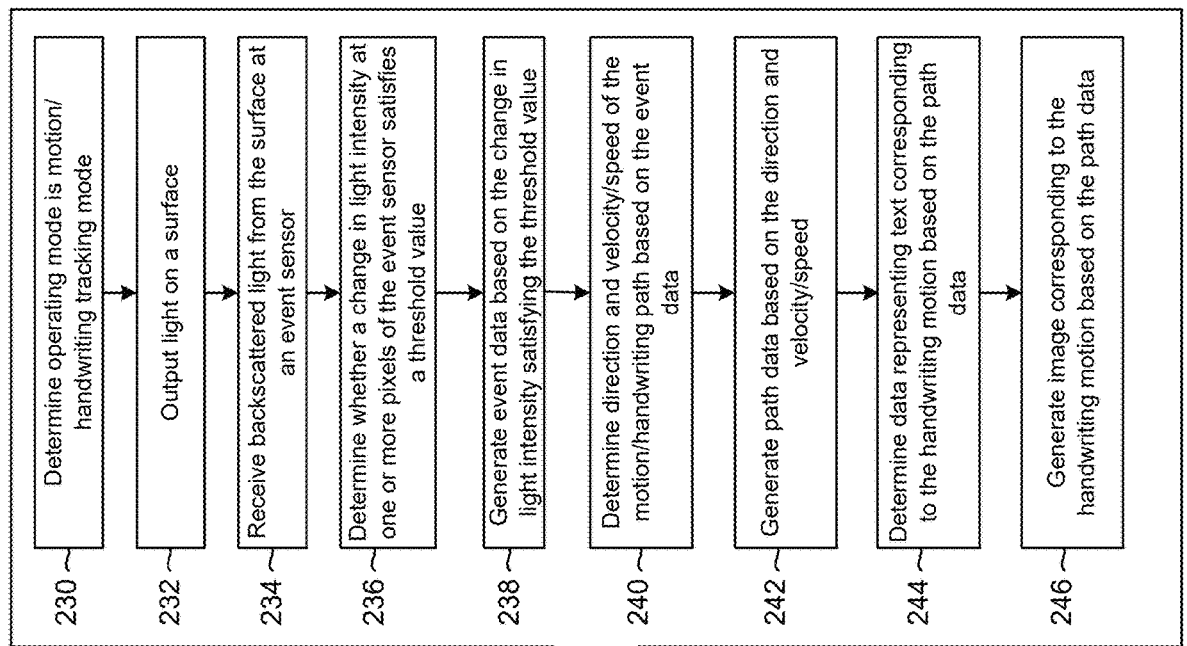
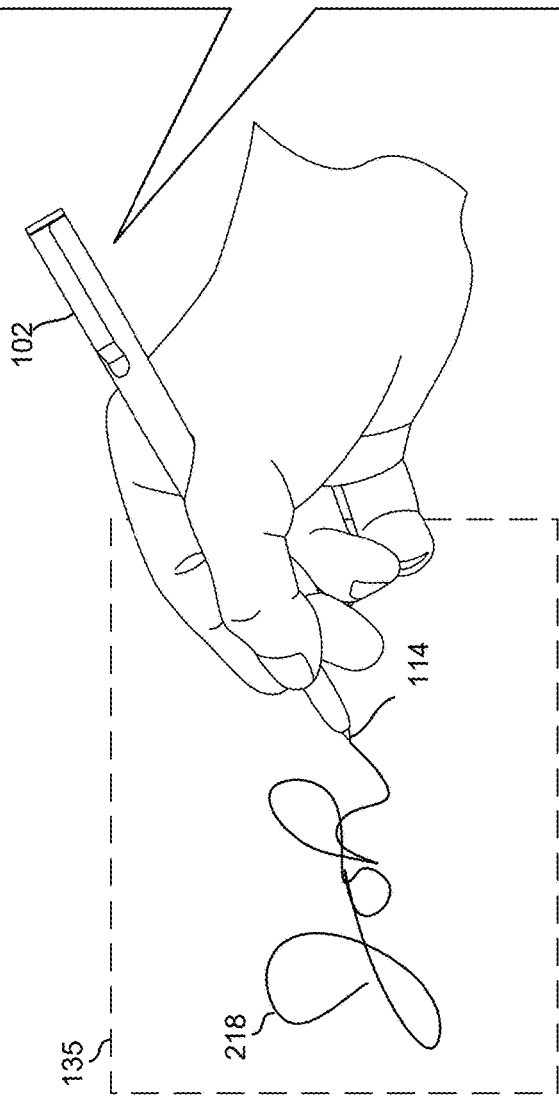

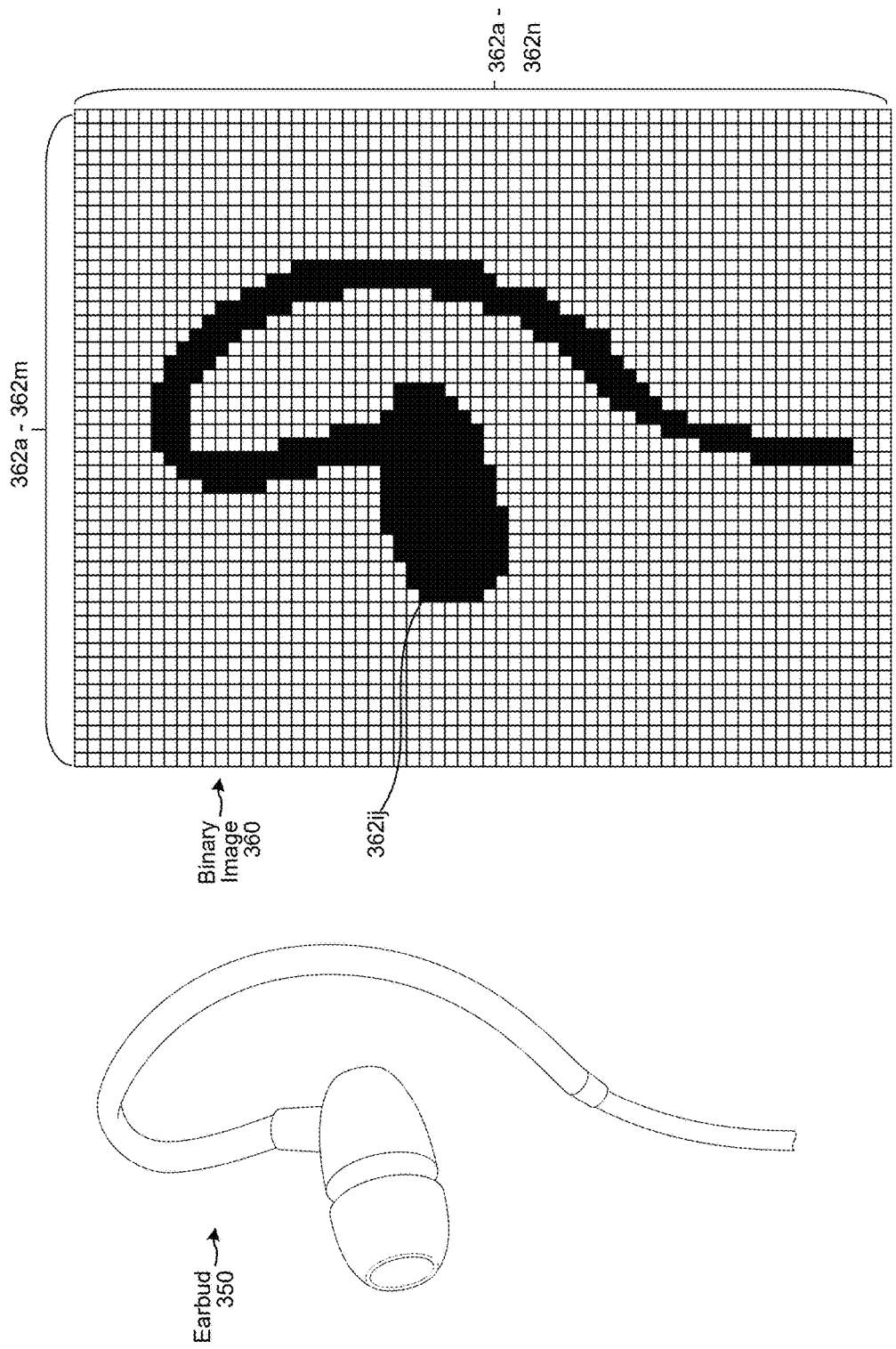

MOTION TRACKING AND IMAGE CAPTURING USING STYLUS DEVICES

BACKGROUND

With the advancement of technology, the use and popularity of electronic devices, such as mobile devices, has increased considerably. Mobile devices, such as smart phones and tablet computers, typically have touch screens that enable a user to operate the devices by touching the screen with a finger or stylus type device. Stylus devices can mimic the use of familiar writing tools, such as pens and pencils.

BRIEF DESCRIPTION OF DRAWINGS

For a more complete understanding of the present disclosure, reference is now made to the following description taken in conjunction with the accompanying drawings.

FIGS. 1B and 1C illustrate an example stylus device, according to embodiments of the present disclosure.

FIG. 2 illustrates an example motion/handwriting tracking mode of a stylus device, according to embodiments of the present disclosure.

FIG. 3B illustrates an example combined binary image, according to embodiments of the present disclosure.

DETAILED DESCRIPTION

Figure 1A:
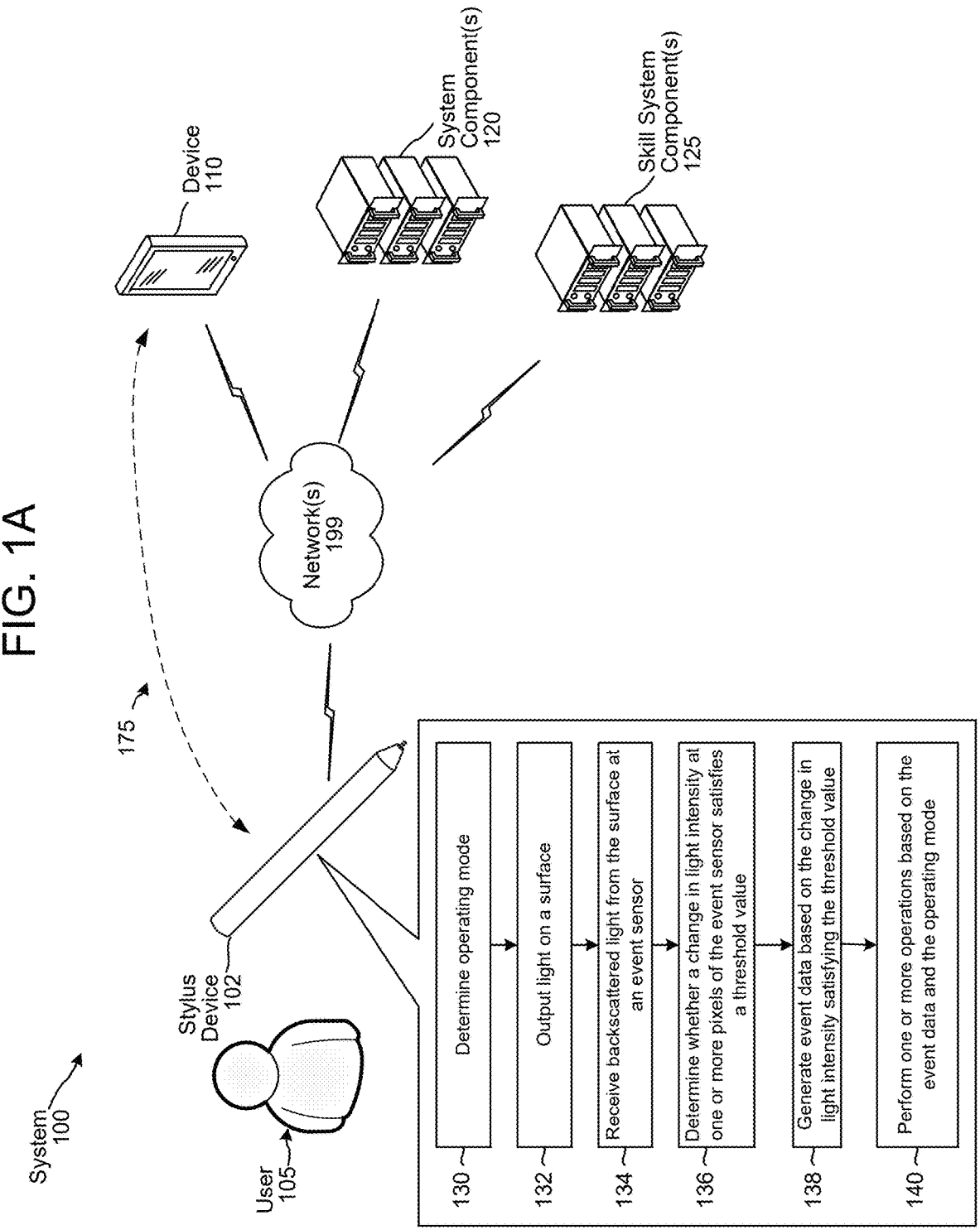
FIG. 1A illustrates an overview of a system in which a stylus device performs various operations based on event data from an event sensor, according to embodiments of the present disclosure.

Conventional frame-based sensors are configured to generate images and/or light intensity measurement data at fixed frame rates. The frame rates of such sensors are generally too slow to be used in tracking fast motions, such as a handwriting motion, across the different images. Capturing images of fast-moving objects using frame-based sensor generally results in blurred images and inaccurate image data. Furthermore, frame-based sensors are configured to generate images and/or light intensity measurements at fixed time intervals even when there is no change in motion or in light intensity. This results in generation of unnecessary and wasteful data which both consumes more power than necessary and further results in needing larger storage capacity than desired for certain form factors, such as a stylus device. Thus, conventional frame-based sensors are ill-suited for motion tracking in computing devices of small form factors, such as a stylus device. Conventional optical flow sensors are hardwired to operate at high frame rates to track fast motions. However, conventional optical flow sensors are incapable of producing data useful in generating images. Therefore, conventional flow sensors are ill-suited for image capturing and/or image generation.

Accordingly, the present disclosure describes, among other things, systems, methods, and techniques for tracking fast motions, such as a handwriting motion, and capturing images using a computing device of a small form factor, such as a stylus device. The techniques described herein use an event sensor (e.g. an event camera) to track changes in light intensity across a surface and track motions across the surface based in part on the changes in light intensity. Such light intensity may be indicative of speckle pattern changes or the like. Additionally, the techniques described herein use the event sensor to capture and/or generate images including capturing and generating images of non-moving objects. Accordingly, the systems, methods, and techniques described herein enable a computing device, such as a stylus device to use a single-sensor to track fast motion and capture images. Therefore, the techniques described herein improve a stylus device by enabling it perform operations that a conventional stylus device is incapable of performing.

Teachings of the present disclosure may be configured to incorporate user permissions and may only perform activities disclosed herein if approved by a user. These permissions may include a grant (or denial) to use a particular component/method. The systems, devices, components, and techniques described herein may thus be configured to restrict processing where appropriate and only process user information in a manner that ensures compliance with all appropriate laws, regulations, standards, and the like. The system and techniques may be implemented on a geographic basis to ensure compliance with laws in various jurisdictions and entities in which the components of the system and/or user are located.

FIG. 1A illustrates an overview of a system 100 in which a stylus device performs various operations based on event data from an event sensor (e.g. an event camera or neuromorphic event sensor). The system 100 may include a stylus device 102, one or more device(s) 110, one or more system components(s) 120, and one or more skill support system component(s) 125 (e.g., components that can execute various functions corresponding to one or more skills 454 shown in FIG. 4). Although the figures and discussion of the present disclosure illustrate certain steps in a particular order, the steps described may be performed in a different order (as well as certain steps removed or added) without departing from the present disclosure.

The stylus device 102 and the system component(s) 120 and the skill support system component(s) 125 may be connected to and in communication with each other via the one or more networks 199. The stylus device 102 and the device(s) 110 may be connected to and in communication with each other via the one or more networks 199 or via a direct connection 175 (such as a Bluetooth connection or the like). The network(s) 199 may include the Internet and/or any other wide- or local-area network, and may include wired, wireless, and/or cellular network hardware. In some embodiments, the device(s) 110, the system component(s) 120, and the skill support system component(s) 125 may be connected to and in communication with each other via the network(s) 199.

The stylus device 102 may be local to a user 105. In some embodiments, the stylus device 102 may be within an environment (e.g., home, office, vehicle, etc.) of the user. In some embodiments the device(s) 110 may be local to the user 105 or within the same environment as the stylus device 102. Examples of the device(s) 110 may include, but are not limited to, tablet computer/device, mobile phone device (e.g., smart phone device), smart watch, and the like. Additional examples of various devices 110 are further illustrated in FIG. 10. The system component(s) may be remote system such as a group of computing components located geographically remote from stylus device 102 but accessible via network 199 (for example, servers accessible via the internet). The system component(s) may also include remote system component(s) that are physically separate from stylus device 102 but located geographically close to stylus device 102 and accessible via network 199 (for example a home server located in a same residence as device 110). System component(s) may also include some combination thereof, for example where certain components/operations are performed via a home server(s) and others are performed via geographically remote server(s)/computing component(s).

Figure 1C:
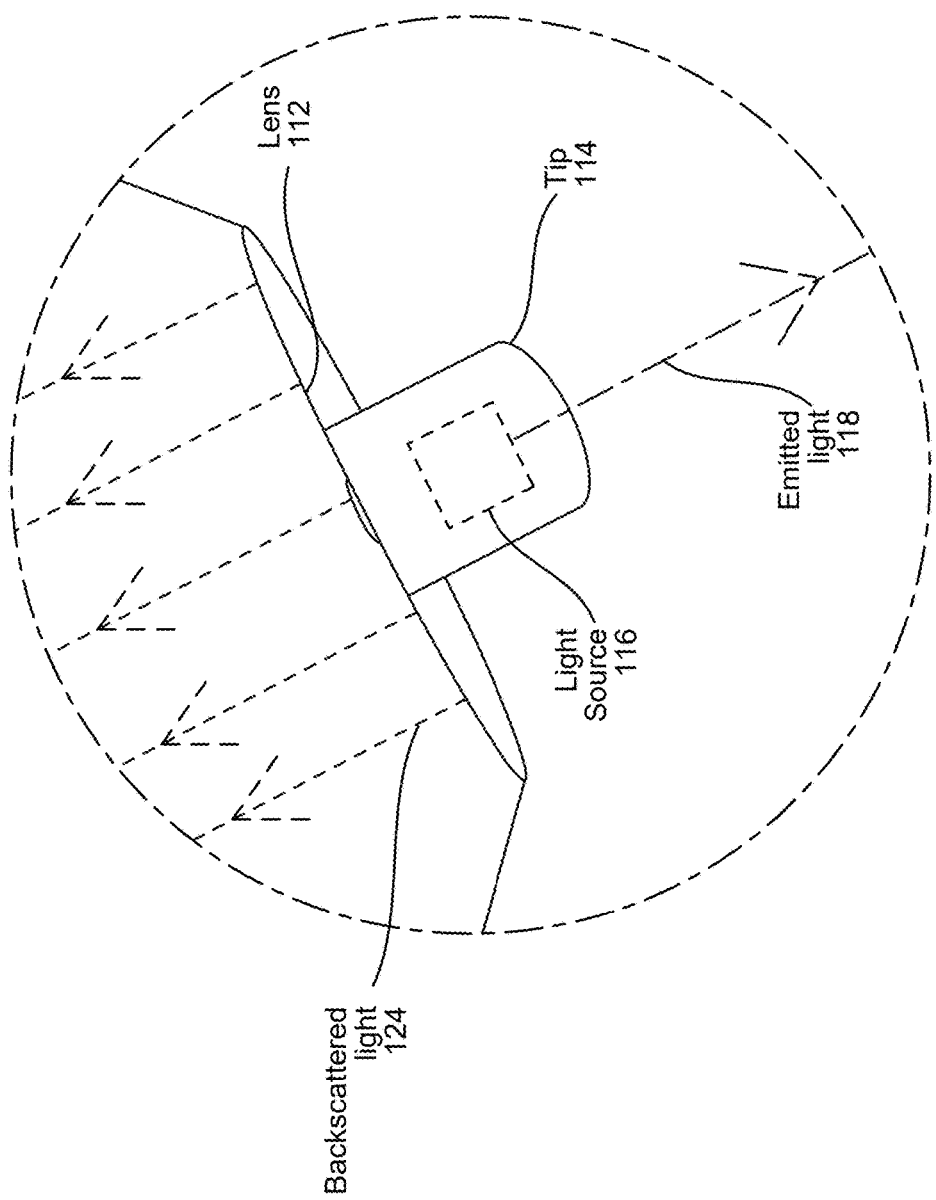

Additional details of the stylus device 102 are shown in FIGS. 1B and 1C. Referring now to FIGS. 1B and 1C, an example stylus device 102 is illustrated. The stylus device 102 may include a body portion 160, an inertial measurement unit (IMU) 162, an event sensor 108 (which may comprise a neuromorphic sensor, neuromorphic camera, neuromorphic vision sensor, silicon retina, dynamic vision sensor, hybrid red, green, blue (RGB) event/neuromorphic sensor, or other type of image sensor), one or more controller(s)/processor(s) 106, one or more communication component(s) 104, a lens 112, a tip 114, a light source/light emitting component 116, a microphone 122. In some embodiments, the stylus device 102 may include components/mechanisms that produce tangible writing, such as pen, ink, and/or other similar components.

The light source 116 may be configured to output/emit a coherent monochromatic (or other form of) light 118. In some embodiments, the light source 116 may be positioned within or proximate to the tip 114 to allow generated light 118 to contact a writing surface 135 and be reflected back toward the stylus 102. The light source 116 may be connected to/comprise an intensity modulator (e.g., a pulse-width modulator, and the like) (not shown separately), and the intensity modulator may be configured to modulate the intensity of the light source. The intensity modulator may be connected to processor(s) 106. The stylus 102 may also be configured to perform other light modulation (for example frequency modulation) if it has the components to do so. Various modulation techniques may be performed by the stylus instead of/in addition to the intensity modulation discussed herein. The processor(s) 106 may be configured to instruct and/or cause the modulator to change the intensity of the light emitted by the light source based on an operating mode of the stylus device 102. In some embodiments, the lights source 116 may be laser diode/device. The stylus device 102 may include one or more force/pressure sensors (not shown separately). The one or more force/pressure sensors may be positioned within or near the tip 114 to detect when the tip 114 is in contact with a writing surface 135. Examples of the force/pressure sensors may include, but are not limited to, an optical pressure sensor, a capacitive pressure sensor, a piezoelectric sensor, a piezoelectric resistive sensor, or other sensor capable of measuring force/pressure. The one or more force/pressure sensors may be configured to determine the amount of force/pressure being applied to the tip 114. The one or more force/pressure sensors may be connected to the processor(s) 106 and configured to provide data to the processor(s) 106 related to the amount pressure or force being applied to the tip 114.

The lens 112 may be a flat lens configured to defocus when the stylus device is in contact or very close to a surface. The communication component(s) 104 may be configured to establish wireless communication connections with the device(s) 110 and/or the system component(s) 120/125. The communication component(s) 104 may include a Bluetooth component, a WiFi component, infrared (IR) component, and the like, and may be configured to transmit and receive information to and from the device(s) 110 and/or the system component(s) 120/125.

As described above, the stylus device 102 may include the IMU 162. In some embodiments, the IMU 162 may include one or more accelerometers, one or more gyroscopes, one or more magnetometers, and/or other similar components. The IMU 162 may determine and/or detect acceleration, angular rate/velocity, orientation, and/or other similar positional or motion data of the stylus device 102. The processor(s) 106 and the IMU 162 may be connected to/in communication with each other. In some embodiments, the IMU 162 may be configured to determine when the stylus device 102 is being moved (e.g., when a user picks-up the stylus device 102 and/or is writing with the stylus device 102) and provide information related to the stylus device being moved or not moved to the processor(s) 106. In some embodiments, the IMU 162 may be configured to provide data corresponding to acceleration, angular rate/velocity, orientation and/or other similar positional or motion data of the stylus device 102 to the processor(s) 106, and the processor(s) 106 may be configured to determine when the stylus device 102 is being moved (e.g., when a user picks-up the stylus device 102 and/or is writing with the stylus device 102) based on the data from the IMU 162. Data from the IMU 162 may be processed along with data from the event sensor 108 to determine the handwriting path of a stylus. The processor(s) 106 may perform a variety of operations to determine a handwriting path based on IMU data and event sensor data. In some embodiments, the processor(s) 106 may be configured to determine a mode of operation (e.g., motion/handwriting tracking mode, image capture mode, and the like) of the stylus device 102 based in part on the data/information from the IMU 162. For example, the processor(s) 106 may determine a user is using the stylus device 102 to write on a surface when the processor(s) 106 determines the pressure data from the one or more force/pressure sensors satisfy the threshold value and the data from the IMU 162 corresponds to a writing motion. The stylus device 102 may include an electronic shutter (e.g., a liquid crystal) (not shown separately) that allows for imaging of an object that is distant from stylus device 102 using the event sensor 108. The electronic shutter may position between the light source 116 and event sensor 108. Additional details of the electronic shutter are described below with reference to FIG. 3A.

The event sensor 108 comprises an imaging sensor (e.g., a neuromorphic camera, neuromorphic vision sensor, silicon retina, dynamic vision sensor, or other type of image sensor) configured to capture changes in intensity at individual pixels of the event sensor 108. The event sensor 108 may include multiple pixels and each pixel in the event sensor 108 may comprise circuitry configured to determine whether a change in intensity of the light (e.g., backscattered light 124) received by the pixel satisfies a threshold intensity value. In response to the change in intensity of light (e.g., light 124) received by a pixel satisfying a threshold value, the corresponding pixel may output data indicating detection of an event (referred to herein as event data). The event data may include a location of the pixel (e.g., a pixel address, pixel identifier, and the like), a time at which the event is detected (e.g., timestamp according to a clock operated by the processor 106), and the like.

In some embodiments, the event data may include a polarity of the event. Polarity of the event may indicate whether a light intensity level increased or decreased. In some embodiments, if the intensity level increased, then the polarity may be a positive value (e.g., 1) and if the intensity level decreased, then the polarity may be a negative value (e.g., −1). In some embodiments, the event data may include a current intensity of the light (e.g., backscattered light, reflected light) received by the pixel, the change in intensity of light, a reference light intensity, and the like. The threshold intensity value may be predefined, user defined, and/or dynamically determined depending on system configuration. Each of pixels of the event sensor 108 may be independent of each other and configured to respond asynchronously to changes in intensity of the light received by the pixel. For example, each pixel may output event data indicating independently of the other pixels when changes in intensity of the light received by the pixel satisfies a threshold value.

Figure 1D:
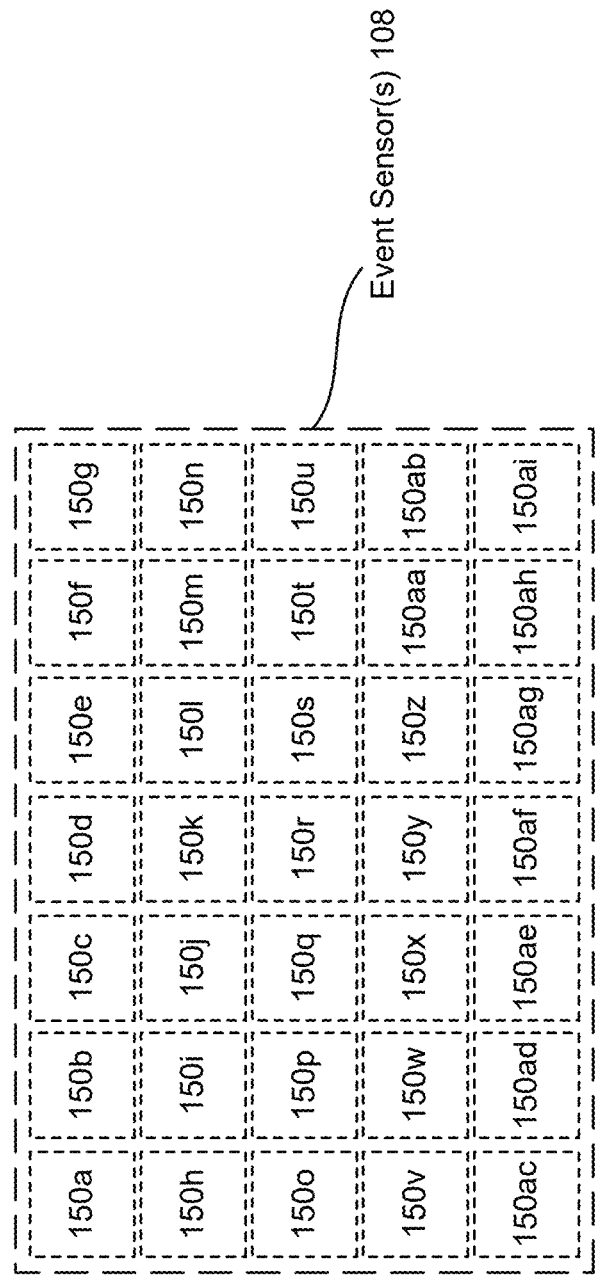
FIG. 1D illustrates an example event sensor, according to embodiments of the present disclosure.

An example of some of the pixels (pixels 150a-150ai) of event sensor 108 is shown in FIG. 1D. Each of the pixels 150a-150ai, collectively referred to herein as pixels 150, may be configured to store and/or use a reference intensity level to compare with a current intensity level of the pixel 150. The current intensity level of the pixel 150 may correspond to the intensity of the light 124 received by the pixel 150. For example, if a low intensity light 124 is received by a pixel 150, then the current intensity level of the pixel 150 may be low, and if a high intensity light 124 is received by the pixel 150, then the current intensity level of the pixel 150 may be high. Similarly, if no light 124 is received by the pixel 150, then the current intensity level may be zero.

Each pixel 150 may be configured to independently and continuously compare the reference intensity level to the current intensity level to determine a difference between the reference intensity level and the current intensity level. If the difference satisfies a threshold value, then the pixel 150 may reset its reference intensity level and determine that an event occurred. The pixel 150 generates and/or outputs event data. An example of changing intensity levels of a pixel 150 is shown in FIG. 1E.

Figure 1E:
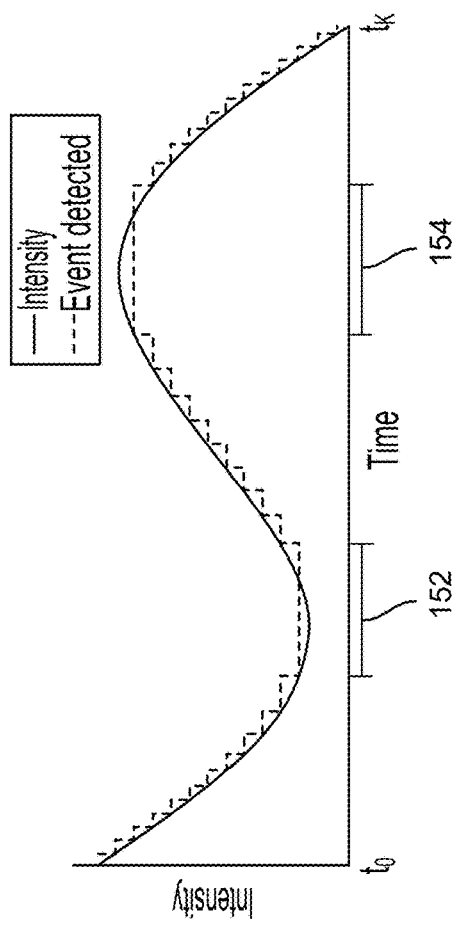
FIG. 1E is graph illustrating example intensity levels of a pixel of an event sensor over a period of time, according to embodiments of the present disclosure.
Figure 1F:
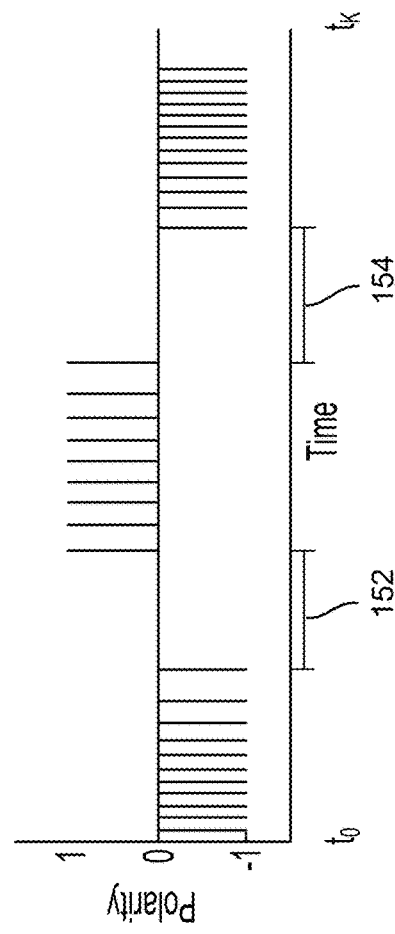
FIG. 1F is a graph illustrating example polarities for the different events detected by a pixel over a period of time, according to embodiments of the present disclosure.

In FIG. 1E, a graph illustrating intensity levels of a pixel 150 over a period of time $t_0$-$t_K$ is shown. Over the time period $t_0$-$t_K$, the pixel 150 may be configured to continuously compare a current intensity level to the reference level, and output event data when the difference between the reference intensity level and the current intensity level satisfies a threshold value. For example, from to until start of time period 152, the difference between the current intensity level and the reference intensity level satisfies a threshold value, and the pixel 150 generates and outputs event data. Similarly, from the end of time period 152 until the beginning of time period 154 and from the end of time period 154 until time $t_K$, the difference between the current intensity level and the reference intensity level satisfies a threshold value, and the pixel 150 generates and outputs event data. However, during the time period 152 and 154, the intensity of the pixel 150 does not change much, and the difference between the current intensity level and the reference intensity level may not satisfy the threshold value indicating that no events are detected. The pixel 150 may not output event data during the time periods 152 and 154 since no events are detected. FIG. 1F illustrates the polarities for the different events detected by the pixel 150 during the time period $t_0$-$t_K$. As can be seen in FIG. 1F, when no events were detected by the pixel 150 during the time periods 152 and 154, then the pixel 150 may not output polarity data.

Referring back to FIG. 1B, the event sensor 108 may output the event data to the processor 106. The processor 106 may be configured to process the event data from the event sensor 108. Based on the processing of the event data, the processor 106 may be configured to determine one or more actions/operations based on the operating mode of the stylus device 102. Examples of the one or more actions/operations may be tracking motion of an action performed using the stylus device 102, such as user's (e.g., user 105) handwriting, capturing images using the stylus device 102 (for example, by pointing the lens of the stylus and allowing the stylus to capture data for a detected image), and the like. The processor 106 may be configured to track direction of the motion, track velocity or speed of the motion, reconstruct the motion's path, generate grayscale images, and the like. For example, if the operation mode of the stylus is configured to track handwriting motion of user 105, then, based on the processed event data, the processor 106 may be configured to determine and track the direction of the handwriting motion and velocity/speed of the handwriting motion over time period(s) during which the user 105 hand writes using the stylus device 102. The processor 106 may be configured to reconstruct the handwriting trace based on the determined direction and velocity of the motion over the time period(s). The stylus 102/processor 106 may then process data representing the handwriting motion into data representing text (which may then be used for downstream purposes, such as processing a command using natural language processing described below in reference to FIGS. 4 and 5). Similarly, if the operation mode is image capturing, the processor 106 may be configured to generate grayscale images of a scene based on the event data. The processor 106 may be configured to perform other operations such as digitizing handwritten notes made using the stylus device 102, detect objects, request additional information on objects and/or scenes in an image, and the like. Additional details of the various operations performed using the event data are described below.

Referring back to FIG. 1A, the stylus device 102 may be configured to determine (130) an operating mode. The stylus device 102 may be configured to operate in multiple modes. Examples of such operating modes include, but are not limited to, motion tracking, such as tracking user 105 handwriting performed using the stylus device 102, capturing images using the stylus device 102, and the like. The stylus device 102 may be configured to determine the operating mode based on a user input received by the stylus device 102. In some embodiments, the user input may be pressing a button on the stylus or interacting with a companion application on device 110 to send a signal to the stylus to enter a specific operating model. In some embodiments, the user input may be an amount of pressure applied to the tip 114 of the stylus device 102. As described above, the tip 114 may include a force sensor, and in some embodiments, the stylus device 102 may be configured to determine that the user 105 has selected a motion tracking operating mode when the amount of pressure/force determined by the force sensor satisfies a threshold amount of pressure. The threshold amount of pressure may be predefined and/or user defined and may be set to an amount of pressure that a user may generally apply when writing on a surface. For example, a user may start writing on a surface 135 (e.g., tabletop, hand, paper, screen of a computing device, and the like), and the stylus device 102 may determine the user has selected motion/handwriting tracking mode if the amount of pressure detected by the force sensor in the tip 114 satisfies a threshold amount of pressure. In some embodiments, the stylus device 102 may be configured to operate in an image capture mode by default unless a user 105 provides an input to switch to another mode (e.g., by using the stylus device 102 to write, as described above). In some embodiments, the stylus device 102 may be configured to select motion/handwriting tracking mode based a proximity of the tip 114 to a surface. For example, if the tip 114 is very near (e.g., almost touching the surface) or within a threshold amount of distance from a surface, then the stylus device 102 may be configured to determine that the user 105 has selected motion/handwriting tracking mode. In some embodiments, the stylus device 102 may receive a user input selecting an operating mode via a touch input or one or more buttons on the stylus device 102.

Once the stylus device 102 is in an operating mode (e.g., motion/handwriting tracking mode, image capture mode, and the like) the stylus device 102 may emit/output (132) light (e.g., light 118) on a surface. For example, the processor 106 may cause the light source 116 to emit light 118 on a surface 135 when the processor 106 determines that an operating mode has been selected. As described above, the surface 135 may be any surface which may have texture or irregularities. In some embodiments, the irregularities may be larger than the wavelength of the light 118. For example, the irregularities may be larger than 800 nanometers. Examples of the surface may include, but are not limited to, paper, a hand, tabletop, desktop, display screen of a mobile computing device (e.g., tablet, smart phone, laptop, and the like), one or more sides of an object, one or more sides of a structure (e.g., building, monument, and the like), etc.

The stylus device 102 may receive (134) backscattered light (e.g., light 124) from the surface at event sensor 108. The backscattered light (e.g., light 124) may be light reflected from the surface 135 on which light is emitted in 132. The backscattered light 124 may pass through lens 112 which will then be detected by the pixels 150. As described above, the backscattered light may represent a speckle pattern that translates or changes as the light being emitted in 132 moves along the surface. For example, if the user 105 is writing with the stylus device 102, then the speckle pattern translates/changes as the light being emitted by the light source 116 in 132 follows the writing motion of the user 5.

The stylus device 102 may determine (136) whether a change in light intensity at one or more pixels of the event sensor 108 satisfies a threshold value. As described above, each pixel (e.g., pixel 150) of the event sensor 108 may independently and continuously determine whether a difference between a current light intensity (e.g., light intensity of the backscattered light in 134 received at the pixel) and reference light intensity satisfies a threshold value.

The stylus device 102 may generate (138) event data based on the change/difference in light intensity satisfying the threshold value. As described, each pixel (e.g., pixel 150) of the event sensor 108 may independently and asynchronously output event data when the difference between the current light intensity and the reference light intensity satisfies the threshold value. The event data, as described above, may include an address of the pixel in the event sensor 108, a timestamp, and/or polarity of the event.

The stylus device 102 may perform (140) one or more operations based on/in part on the event data and the operating mode. For example, if the operating mode determined by the stylus device 102 is motion/handwriting tracking mode, then the stylus device 102 may track the direction and velocity/speed of the handwriting motion over time period(s), and generate a handwriting trace based on the tracked direction and velocity/speed of the handwriting motion. Similarly, if the operating mode determined by the stylus device 102 is image capture mode, then the stylus device 102 may generate one or more grayscale images of the object of interest and/or the scene including the object of interest using the light intensity change information described herein. Other operations that the stylus device 102 may perform include transmitting the generated images, such as the handwriting trace image, grayscale images, and the like, to device(s) 110 to be displayed, transmitting the generated images to further components for operations such as image processing/recognition (using components such as image processing component 440 discussed below), conversion to text for processing by natural language understanding (NLU) components, language model components, and the like (such as those described in reference to FIGS. 4 and 5 below), and transmit any requests for information related to the images. Additional details of such operations are provided below with reference to FIGS. 2-6.

FIG. 2 illustrates an example motion/handwriting tracking mode of the stylus device 102. In FIG. 2, the user 105 may use the stylus device 102, for example, to handwrite the name "John" (illustrated as 218) on a surface 135. As described above, the surface 135 may be any textured surface including, but not limited to, a hand (e.g., the user's or another person's hand), a tabletop, paper, display screen of a mobile computing device, and the like. The stylus device 102 may determine (230) that the operating mode is motion/handwriting tracking mode in response to the user 105 applying the threshold amount of pressure to start writing the name "John" 218 or in response to the user 105 bringing the tip 114 of the stylus device 102 within a threshold distance of the surface 135. In some embodiments, the stylus device 102 (e.g., via processor(s) 106) may determine the operating mode is motion/handwriting tracking mode based in part on data from the one or more force/pressure sensors satisfying a threshold pressure value and data from the IMU 162 corresponding to a writing motion.

The stylus device 102 may emit/output (232) light on the surface 135 in response to determining that the stylus device is operating in motion/handwriting tracking mode. As user 105 moves the stylus device 102 as if to write the name "John" 218 on the surface 135, the emitted light (e.g., light 118) follows the motion of the user's hand and illuminates portions of the surface 135 that are covered by the name "John" 218. For example, in FIG. 2, as the user 105 writes the letters "J," "o," and "h" of 218, the emitted light follows the path of those written letters and illuminates the portions of the surface 135 covered by "J," "o," and "h" of 218. The stylus 102 may detect the handwriting motion using the light capture techniques even if the stylus itself does not produce any tangible writing (e.g., using ink, pencil, images of the handwriting on the tablet surface, etc.). The light capture processing may be used by the stylus 102 to determine movement of the tip 114 corresponding to the handwriting movements, even if no lingering "writing" is produced. In some embodiments, the stylus device 102 may detect the handwriting motion using the light capture techniques and based in part on the data from the IMU 162.

The stylus device 102 may receive (234) the backscattered light 124 reflected from the surface 135. As described above, the backscattered light exhibits or represents a speckle pattern. In FIG. 2, the speckle pattern translates/changes as the light emitted in (232) moves along the surface 135 in the motion of the "J," "o," and "h" of 218 over one or more time periods in which the path 218 of the name is traversed by the tip 114, and the backscattered light may be received by different pixels (e.g., pixels 150) of the event sensor 108 over the one or more time periods in which the path 218 is traversed.

The stylus device 102 may determine (236) whether a change in light intensity at one or more pixels satisfies a threshold value. As described above with reference to FIG. 1D, a change in light intensity at a pixel is the difference between a current light intensity of the pixel and a reference light intensity, and each of the pixels 150 of event sensor 108 may be configured to independently and continuously determine whether the difference between the current light intensity and the reference light intensity satisfies the threshold value. The stylus device 102 may generate (238) event data based on the change in light intensity satisfying a threshold value. For example, the different pixels 150 that received the backscattered light while 218 is being written may asynchronously generate event data based on the changes in light intensity satisfying the threshold value.

The stylus device 102 may determine (240) direction and velocity/speed of the motion/handwriting path based on the event data generated in (238). As described above, the event data may include a pixel address of the pixel generating the event data, a timestamp corresponding to the time at which the pixel detected the event, and/or a polarity of the event. As the different event data is generated, stylus device 102 may be configured to cross-correlate between different event data and their associated timestamps to determine the direction. For example, the stylus device 102 may be configured to determine direction of the handwriting motion based on pixel address associated with a first event data and a pixel address associated with a second event data. As another example, if pixel 150p (shown in FIG. 1D) generates the first event data, and pixel 150j (shown in FIG. 1D) generates the second event data, then the stylus device 102 may be configured to determine that the stylus device 102, and the handwriting motion, traveled from 150p in the direction (e.g., 45 degrees) towards 150j between the times of the first event data and the second event data. The stylus device 102 may be configured to cross-correlate between different event data and their associated timestamps to determine the velocity/speed of the motion/handwriting. For example, the stylus device 102 may be configured to determine a velocity/speed of the handwriting motion based on timestamps of the different event data and distance between the pixels 150 that generated the corresponding event data. As another example, the stylus device 102 may determine a time difference between the first event data from pixel 150p and the second event data from the pixel 150j based on the timestamps of the first event data and the second event data and the distance between pixels 150p and 150j, and based on the time difference and the distance between pixels 150p and 150j, the stylus device 102 may determine a velocity/speed of the handwriting motion. In some embodiments, the stylus device 102 may be configured to determine the direction and/or the velocity/speed of the handwriting motion based in part on the data (e.g., acceleration, angular rate/velocity, orientation, and/or other similar positional or motion data of the stylus device 102) from IMU 162 and/or on one or more of the above-described determinations using the event data.

In some embodiments, the stylus device 102 may be configured to map each pixel 150 of the event sensor 108 to one or more pixels in a binary image. In some embodiments, the stylus device 102 may be configured to generate a one or more binary images based on event data generated during the time period in which 218 is written or during portions/segments of the time period in which 218 is written. Each binary image may have a high value (e.g., 1) at a pixel in the image that corresponds to the pixel 150 of the event sensor 108 that generated the event data and may be associated with a timestamp of the event data. For example, a binary image based on event data from pixel 150p may have a high value at a pixel in the binary image that corresponds to pixel 150p and a binary image based on event data from pixel 150j may have a high value at a pixel in the binary image that corresponds to pixel 150j. The stylus device 102 may be configured to cross-correlate between different binary images and their associated timestamps to determine the direction and the velocity/speed of the motion/handwriting. The stylus device 102 may be configured to generate motion vectors based on the binary images. The stylus device 102 may be configured to generate a motion vector by processing the binary images using one or more image processing algorithms (e.g., block-match algorithm, optical flow algorithm, Lucas-Kanade algorithm, corner detection algorithm, and the like) for generating motion vectors.

The stylus device 102 may generate (242) path data based on the direction and velocity/speed of the motion. In some embodiments, the stylus device 102 may concatenate the directions and velocity/speed of the motion determined at different time instances over the period of time in which 218 was written by user 105, and the path data may correspond to the concatenated directions and velocity/speed of the motion. For example, the stylus device 102 may have determined that the user 105 moved the stylus device 102 at a 45 degree angle for a distance d1 between time t0 and t1, at a 0 degree angle for a distance d2 between time t1 and t2, and at a 33 degree angle for a distance d3 between t2 and t3. The stylus device 102 may determine the path data by concatenating the distances d1 to d2 to d3 at their respective directions (e.g., angles). In some embodiments, the stylus device 102 may be configured to map each pixel 150 of the event sensor 108 to a two-dimensional (2D) coordinate space (e.g., x-y coordinate space) and may generate a 2D motion vector to represent the path data in the 2D coordinate space over the time period in which path 218 is traversed by the tip 114, and the motion vector may correspond to the path of the user's handwriting motion. In some embodiments, a motion vector may be generated using the binary images over the time period in which path 218 is traversed by the tip 114, and the motion vector may correspond to the path of the user's handwriting motion. In some embodiments, the processor(s) 106 and/or the event sensor 108 may be configured with one or more trained neural networks, such as a spiking convolutional neural networks (SCNNs), that are configured to track handwriting motion based on the event data. In some embodiments, the SCNNs may be trained using large amount/instances of event data generated by pixels of various event sensors while tracking the event sensors were used in tracking handwriting motions.

In some embodiments, the stylus device 102 may transmit the path data and/or motion vector data to a downstream component (e.g., a component residing in stylus 102, a system component 120, a system component 125, and the like) configured to determine/generate (244) text data based on the path and/or motion vector data. In some embodiments, the component may be configured to perform optical character recognition (OCR), for example as part of image processing component 440 discussed below. The text data representing the handwriting path 218 may be sent to a language processing component, such as those described below. In some embodiments, the stylus device 102 may, on its own, determine/generate (244) the text data based on the handwriting path 218. In some embodiments the stylus device 102 may determine/receive (244) the text data from another device/component. In some embodiments, the stylus device 102 may store the received text data in a storage device of the stylus device 102 or a storage device communicatively coupled to the stylus device 102. In some embodiments, the stylus device 102 may transmit the text data to one or more device(s) 110 communicatively coupled to the stylus device 102. In some embodiments, the stylus device 102 may cause the received text data to be displayed on a display device of one or more device(s) 110 communicatively coupled to the stylus device 102.

The stylus device 102 may generate (246) an image corresponding to the handwriting motion based on the path data. As described above, the path data may be represented by a motion vector. The stylus device 102 (or system component(s) 120/125) may be configured with one or more image reconstruction algorithms. The stylus device 102 (or system component(s) 120/125) may generate an image corresponding to the handwriting motion using a reconstruction algorithm and the motion vector. In some embodiments, the stylus device 102 (or system component(s) 120/125) may be configured to transmit the generated image to one or more device(s) 110 communicatively coupled to the stylus device 102 and may cause the generated image to be displayed on a display device of the one or more device(s) 110.

Figure 3A:
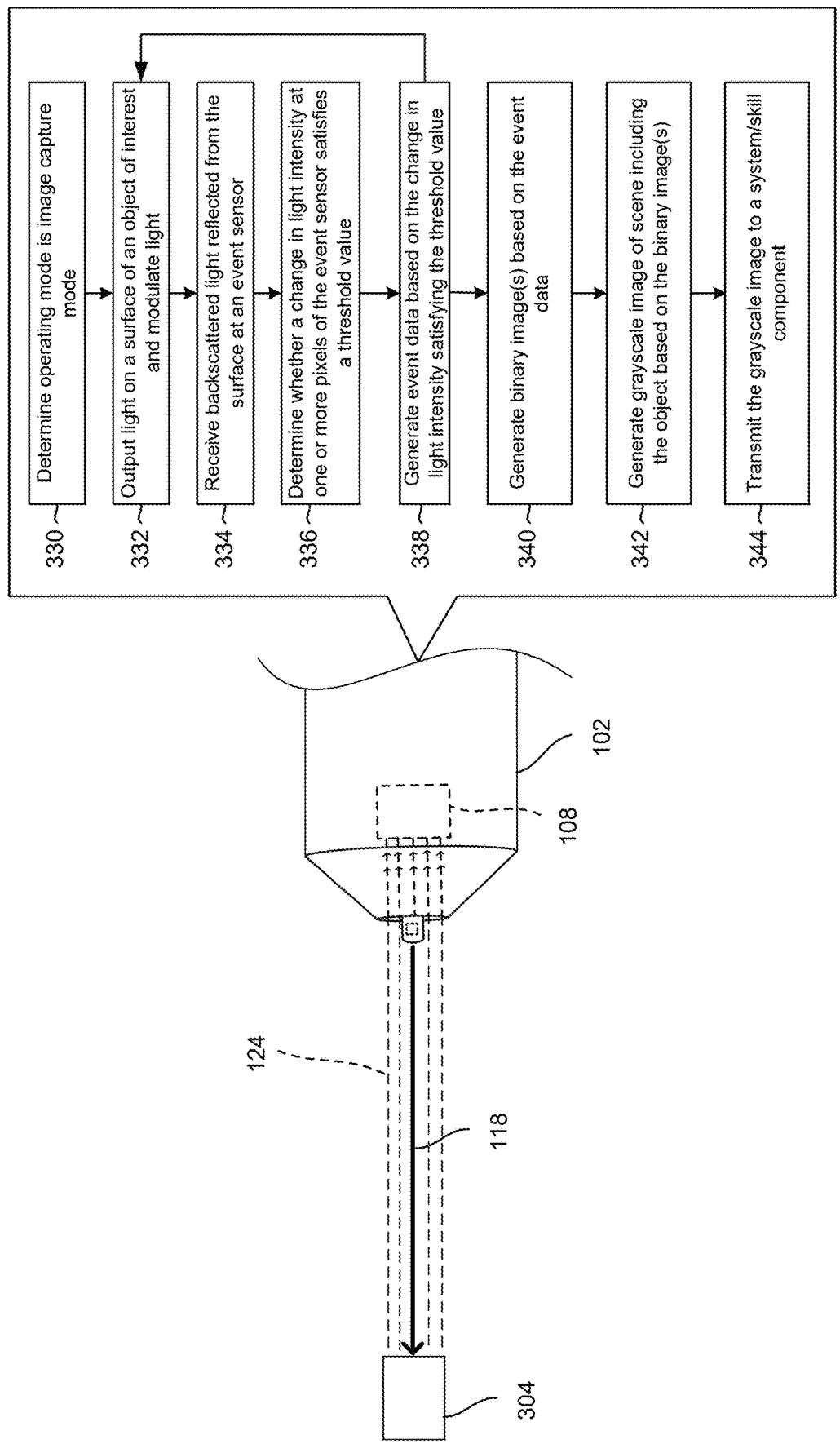
FIG. 3A illustrates an example image capturing mode of a stylus device, according to embodiments of the present disclosure.

FIG. 3A illustrates an example image capture mode of the stylus device 102. In FIG. 3A, the user 105 may provide an input to the stylus device 102 indicating a selection of image capture operating mode of the stylus device 102. In some embodiments, the user input may be a speech input from the user 105 requesting an action to be performed by the stylus device 102 while the user 105 is using the stylus device 102. For example, the user 105 may point the stylus device 102 at an object (e.g., object 304), such as a menu, an equation in a book, at a dog, or a sign for a restaurant and request the stylus device 102 to perform an action with respect to the object 304, such as translate the menu, solve the equation, request information about the type of dog, or directions to the restaurant. In some embodiments, the user input may be via an interaction with a button on the stylus device 102. The stylus device 102 may determine (330) that the operating mode is image capture based on the user input.

The stylus device 102 may emit/output (332) light 118 on one or more surfaces of the object 304 and may modulate/change intensity of the light 118 over a period of time when operating in image capture mode. As described above, pixels of an event sensor may be configured to generate event data based on whether a change in light intensity at the respective pixel satisfies a threshold value. However, when light is emitted at a non-moving object, then the pixels of the event sensor may not detect/determine any change in intensity of the backscattered light they receive and may not generate any event data. Without the event data, the stylus device 102 may not be able to capture and/or generate images using an event sensor. To overcome such a challenge, and to improve functionality and usability of the event sensor, in capturing and/or generating image(s) of non-moving objects, the stylus device 102 may be configured to modulate/change intensity of light emitted (e.g., light 118) on a non-moving object (e.g., object 304) over a period of time (e.g., a period of time while the stylus device 102 operates in image capture mode). In some embodiments, modulating/changing intensity of the light 118 may refer to modulating/changing power of the light 118, luminous intensity of the light 118, and/or other similar characteristics of the light 118. In some embodiments, the stylus device 102, via processor(s) 106, may be configured to modulate/change the intensity of the light 118 by modulating the light source 116. As described above, the light source 116 may be connected to/comprise a modulator (e.g., a pulse-width modulator (PWM), and the like). The processor(s) 106 may be connected to the modulator and may be configured to cause and/or instruct the modulator to modulate/change the intensity of the light 118 by a system-defined and/or a user-defined level over the period of time. The stylus device 102 may be configured to modulate/change intensity of the light 118 at system-defined and/or a user-defined time intervals. For example, when the stylus device 102 determines the operating mode is image capture mode, the stylus device 102 (e.g., via processor(s) 106) may emit/output light 118 at a low power initially and then increase the power of the light 118, by system-defined and/or user-defined power levels, at a system-defined and/or a user-defined time interval of 2 microseconds over a period of time during which one or more surfaces of object 304 is illuminated.

Modulating/changing the intensity of the emitted light 118 over a period of time also causes corresponding modulations/changes to the intensity of the backscattered light 124 reflected from the surface(s) of the object 304, and the pixels 150 receive the backscattered light 124 at different power levels. For example, light 118 may be emitted at a first power level at a first time and the power level of the backscattered light 124 received by the pixels 150 after the first time may be at the first power level, then the light 118 may be emitted at a second power level at a second time and the power level of the backscattered light 124 received by the pixels 150 after the second time may be at the second power level, and then the light 118 may be emitted at a third power level at a third time and the power level of the backscattered light 124 received by the pixels 150 after the third time may be at the third power level, and so on over time period during which the light 118 is emitted/output and the backscattered light 124 is reflected over from the surface(s) of the object 304 and received by the pixels 150.

The different intensities at which the backscattered light 124 is received by the pixels 150 allows for the pixels 150 to determine whether a change in light intensity at the respective pixel 150 satisfies a threshold value and generate corresponding event data. The stylus device 102 may capture and/or generate one or more images of the object 304 based on the event data, additional details of which are described below.

The stylus device 102 may be configured to capture and/or generate images of an object at a large distance from the stylus device 102. For example, object 304 may be a monument and/or a structure at a large distance away from the stylus device 102. The object 304 (e.g., a monument, a building, a structure) may be a non-moving object, and to capture the image of such object 304. In some embodiments, the stylus device 102 may receive a user input indicating that the user (e.g., user 105) desires to capture image of a far away object. Examples of such user inputs include, but are not limited to, a further/additional interaction with the button that selected the image capture mode, an interaction with another button on the stylus device 102, a speech input from the user 105 requesting an action to be performed by the stylus device 102 with respect to the far away object (e.g., "tell me about that monument," "who built that structure," etc.) while the user 105 is using the stylus device 102 (e.g., point the stylus device 102 at the monument, structure, etc.), and the like. Based on such user input, the stylus device 102 may be configured to use ambient light illuminating the object 304, and in some embodiments, the stylus device 102 may not emit light 118. The ambient light that illuminates the object 304 is reflected off the object 304, and the pixels 150 of the event sensor 108 receive that reflected light.

Since the far away object 304 is a non-moving object, the stylus device 102 may use an electronic shutter to change intensity of the light received by the pixels 150 over a period of time and cause the pixels 150 to generate event data based on changes in intensity of the light received at the respective pixels 150 satisfying a threshold value over the time period. As described above, in some embodiments, the stylus device 102 may include an electronic shutter, such as a liquid crystal, and it may be positioned between the event sensor 108 and the tip 114 of the stylus device 102, between the light source 116 and the event sensor 108, and other similar positions, to allow for imaging of objects at a large distance from the stylus device 102. The electronic shutter may be connected/comprise an electronic on-off switch. The processor(s) 106 may be connected to the electronic shutter and/or the electronic on-off switch and may configured to cause and/or instruct the on-off switch to turn on or turn off the electronic shutter. The electronic shutter, when turned on, may block light (e.g., reflected light) from being received by the pixels 150 of the event sensor 108, and when turned off, the electronic shutter allows for the light (e.g., the reflected light) to be received by the pixels 150. The turning the electronic shutter on and off over a period of time causes changes in the intensity of the light being received by the pixels 150 over the period of time. For example, the electronic shutter may be turned off for a first time interval and one or more pixels 150 may receive the reflected light from the far away object 304 and these pixel(s) 150 may set/reset their respective reference light intensity levels, then the electronic shutter may be turned on for a second time interval and the pixels 150 that received the reflected light in the first time interval may not receive any light in the second time interval. The change (difference between the reference light intensity and current light intensity) in the intensity of the light being received at these respective pixel(s) 150, between the first time interval and the second time interval, may satisfy the threshold level and these pixel(s) 150 may generate respective event data. The electronic shutter may be turned off for a third time interval and these pixels 150 may receive the reflected light from the object 304, and these pixels 150 may again determine the change in the intensity of the light being received satisfies threshold value and generate respective event data. The stylus device 102, via processor(s) 106, may continue to turn the electronic shutter on and off for a system-defined and/or user-defined period of time and the pixels 150 that receive the reflected light from the far away object 304 may generate event data over that period of time. The stylus device 102 may be configured to turn the electronic shutter on and off at system-defined and/or user-defined intervals. In some embodiments, the stylus device 102 may be configured to maintain the electronic shutter its on mode/position and its off mode/position for a system-defined and/or user-defined duration of time interval. In some embodiments, the system-defined and/or the user-defined duration of time intervals may be small. In some embodiments, the stylus device 102 may be configured to turn/switch the electronic shutter on and off at a very rapid rate. Using such generated event data and the techniques described herein (e.g., with reference to operations 340, 342, 344), the stylus device 102 may capture and/or generate one or more images of monuments, buildings, structures, and/or other objects that are far away from the stylus device 102.

The stylus device 102 may receive (334) backscattered light 124 reflected from the surface of the object of interest 304 at the event sensor 108. The backscattered light 124 may be received at pixels 150 of the event sensor 108 that correspond to position of the object 304 in the scene. For example, if a portion of a surface of the object 304 being illuminated in (332) corresponds to pixels 150*a*, 150*b*, 150*h*, 150*i*, 150*o*, and 150*p*, then the backscattered light 124 may be received at these pixels.

The stylus device 102 may determine (336) whether a change in light intensity at one or more pixels of the event sensor satisfies a threshold value. The stylus device 102, via the pixels 150, may generate (338) event data based on the change in light intensity satisfying the threshold value. As intensity of the light emitted in (332) increases, the intensity of the backscattered light 124 also increases, and the number of times the pixels 150 that receive the backscattered light 124 determine that the change in light intensity satisfies the threshold value and generate event data also increases. In some embodiments, one or more portions of an object 304 may be more reflective than one or more other portions of the object 304. Intensity of backscattered light 124 reflected from the portion(s) that are more reflective may be greater than intensity of backscattered light 124 reflected from the other portion(s) of the object 304. One or more pixels 150 that receive the backscattered light 124 reflected from the more reflective portion(s) may determine the respective change in light intensity satisfies the threshold value earlier, and generate respective event data earlier, than the pixels 150 that receive the backscattered light 124 reflected from the other portion(s) of the object 304. In some embodiments, even at low intensity levels of light emitted in (332), the intensity of the backscattered light 124 reflected from the portion(s) of the object that are more reflective may be strong/high enough that the pixels 150 that receive the backscattered light 124 reflected from the more reflective portion(s) may determine their respective change in light intensity satisfies the threshold value and generate respective event data. The pixel(s) 150 that receive the backscattered light 124 reflected from the more reflective portion(s) of the object 304 may generate event data more number of times than other pixels 150. In some embodiments, edges of an object may reflect light more and pixels 150 that receive backscattered light 124 reflected from such edges may generate event data more number of times than other pixels 150.

The stylus device 102 may generate (340) one or more binary images based on the event data. As described above, in some embodiments, the stylus device 102 may be configured to map each pixel 150 of the event sensor 108 to one or more pixels in a binary image and, based on the event data generated by and/or output from the pixel 150, the stylus device 102 may determine a value of the mapped/corresponding pixel in the binary image. In some embodiments, the stylus device 102 may determine a value of the mapped/corresponding pixel(s) in the binary image based on the number of times the corresponding pixel 150 generated event data during a period of time (e.g., the period of time during which the light in (332) is emitted, any portions/segments of such a period of time, and/or any other similar time periods associated with emitting of light in (332)), an intensity level of the backscattered light 124 that caused the pixel 150 to generate the event data, an intensity level of light emitted in (332) that resulted in the backscattered light 124 that caused pixel 150p to generate the event data, and/or other characteristics of the emitted light in (332) or the backscattered light 124 received by the pixel 150. In some embodiments, the stylus device 102 may be configured to update (e.g., increased or decreased) values of the pixels in a binary image based on the number of times a pixel 150 generates event data. For example, for each event data generated by a pixel 150, the stylus device may be configured to update (e.g., increase or decrease) the value of the mapped/corresponding pixel(s) in a binary image. In some embodiments, the stylus device 102 may be configured to update the value of the mapped/corresponding pixel(s) for each threshold number of times the pixel 150 generates event data. For example, the stylus device 102 may update the value of the mapped/corresponding pixel(s) for every third event data generated by the pixel 150. In some embodiments, a stylus device 102 may increase the value of a pixel in the binary image as the number of times (or the threshold number of times) the pixel 150 generates event data increases. In some embodiments, a stylus device 102 may decrease the value of a pixel in the binary image as the number of times (or the threshold number of times) the pixel 150 generates event data increases. In some embodiments, the stylus device 102 may update values of the pixel(s) in the binary image periodically. In some embodiments, every time a pixel 150 generates an event data, the stylus device 102 may update values of the mapped/corresponding pixel(s) in the binary image. The stylus device 102 may generate the binary image(s) based on a combination of the determined/updated values of the pixels. In some embodiments, a size (e.g., number of pixels) of a binary image generated by the stylus device 102 may be based on the size of the event sensor 108, the number of pixels of the event sensor 108, and the like.

An example of a binary image is shown in FIG. 3B. The binary image 360 in FIG. 3B may be of size 362m×362n pixels (collectively referred to herein as pixels 362), and pixel 362ij is a pixel of the binary image 360. In FIG. 3B, the object 304 in FIG. 3A may be earbud 350, and the user 105 may point the stylus device 102 at the earbud 350 and provide an input to the stylus 102 to capture an image of the earbud 350. The stylus device 102 may perform the operations discussed above (e.g., operations (332)-(338)), and for each pixel 150 of the event sensor 108, the stylus device 102 may determine/update a value of the mapped/corresponding pixel(s) 362 in the binary image 360 based on the event data from the pixel 150 as described above. For example, if pixel 150p (shown in FIG. 1D) of event sensor 108 maps to pixel 362ij of binary image 360, then the stylus device 102 may determine/update a value of pixel 362ij based on the number of times pixel 150p generated event data, intensity level of backscattered light 124 received by the pixel 150p, intensity level of emitted light 118 that resulted in the backscattered light 124 that caused pixel 150p to generate the event data, and the like. The stylus device 102 may generate the binary image 360 based on a combination of the determined/updated values of each the pixels 362.

Referring back to FIG. 3A, the stylus device 102 (or other device such as device 110, system component(s) 120/125) may generate (342) a grayscale image based on the binary image(s) and/or on values of pixels of the binary image(s). The stylus device 102 may perform a statistical operation (e.g., average, and the like) one or more pixels of the binary image(s) to generate a grayscale image. The stylus device 102 may perform the statistical operation on a pixel based on the value of the pixel and data associated with the value of the pixel, the emitted light 118, the backscattered light 124, and the like. For example, the stylus device 102 may generate an average pixel value for one or more pixels of the binary image using the respective values of the pixel(s) and the length of time or time period for which the object 304 is illuminated, the changes in intensity of the light emitted in (332) over the time period in which the object 304 is illuminated, number of times the corresponding pixel(s) 150 generated event data, intensity of the backscattered light 124 when the event data was generated, intensity of the emitted light 118 that resulted in the backscattered light 124 that caused the pixel 150 to generate the event data, and/or other similar data associated with the value of the pixel. The resulting grayscale image may include the object 304, along with any details (e.g., lettering, writing, patterns, and the like) on the one or more surfaces of the object 304 from which the backscattered light 124 is received at sensor 108. For example, using the example binary image 360 of FIG. 3B, the stylus device may generate a corresponding grayscale image by calculating an average pixel value for one or more pixels 362 in the combined binary image 360. In some embodiments, the stylus device 102 may generate the grayscale image by combining the binary image(s) over the time period in which object 304 is illuminated by light 118 and performing a statistical operation over one or more pixel values of the combined binary image. For example, for each combined pixel value in the combined binary image, the stylus device 102 may calculate an average pixel value for that pixel.

The stylus device 102 may transmit (344) the generated grayscale image to a system/skill component 120/125 to perform various additional operations, for example as image data 421 described below. Therefore, even though a conventional event sensor is configured to only capture motion of a moving object, the techniques described herein for improve functionality and usability of the event sensor in capturing and/or generating image(s) of non-moving objects.

In some embodiments, the stylus device 102 may transmit the generated grayscale image to an object detection component to identify the different one or more objects in the image. In some embodiments, the stylus device 102 may transmit the grayscale image to a language model component to receive information related to one or more user inputs about object(s) in the grayscale image. For example, the stylus device 102 may transmit a generated grayscale image including the equation in a textbook and the user request to solve the equation to a language model component. Similarly, the stylus device 102 may transmit to language model component a generated grayscale image including the dog and the user request for information about the type/breed of the dog, or a generated grayscale image including the restaurant sign and the user request for directions to the restaurant.

In some embodiments, the event sensor 108 may be a hybrid RBG event/neuromorphic sensor (referred to herein as hybrid event sensor). The hybrid event sensor may be a combination (e.g., in a single package) of an event sensor, as described herein, and an RGB image capture sensor/camera. The hybrid event sensor may be configured to operate in multiple modes, such as a mode corresponding to motion tracking, a mode corresponding to image capture, etc. In the mode corresponding to motion tracking, the hybrid event sensor may be configured to use its event sensor (or pixels of that event sensor) to perform the various handwriting/motion tracking operations described herein including but not limited to operations (234), (236), (238). In the mode corresponding to image capture, the hybrid event sensor may be configured to use the RGB image capture sensor/camera to capture and/or generate one or more images (e.g., RGB image(s)) of an object (e.g., object 304) without generating a grayscale image and/or without intensity of light emitted on the object being modulated/changed.

The stylus device 102 (e.g., via processor(s) 106) may cause the hybrid event sensor to operate in a mode based on the mode determined by the stylus device (e.g., in operation (230) of FIG. 2 or operation (330) of FIG. 3A). For example, if the stylus device 102 determines that the operating mode is handwriting/motion tracking as described in (230), then the stylus device 102 may cause the hybrid event sensor to operate in the mode corresponding to motion tracking and the hybrid event sensor may be configured to use its event sensor (or pixels of that event sensor) to perform the various operations described herein including but not limited to operations (234), (236), (238). Similarly, if the stylus device 102 determines that the operating mode is image capture as described in (330), then the stylus device 102 may cause the hybrid event sensor to operate in the mode corresponding to image capture, and the hybrid event sensor may be configured to capture and/or generate RGB images of an object (e.g., object 304) using its RGB image capture sensor/camera, and the stylus device 102 may not generate a grayscale image and/or may not modulate/change intensity of light emitted (e.g., in (332)) on the object. The stylus device 102 may be configured to transmit the RGB image captured and/or generated by the hybrid event sensor to a system/skill component 120/125 to perform various additional operations as described herein.

Figure 4:
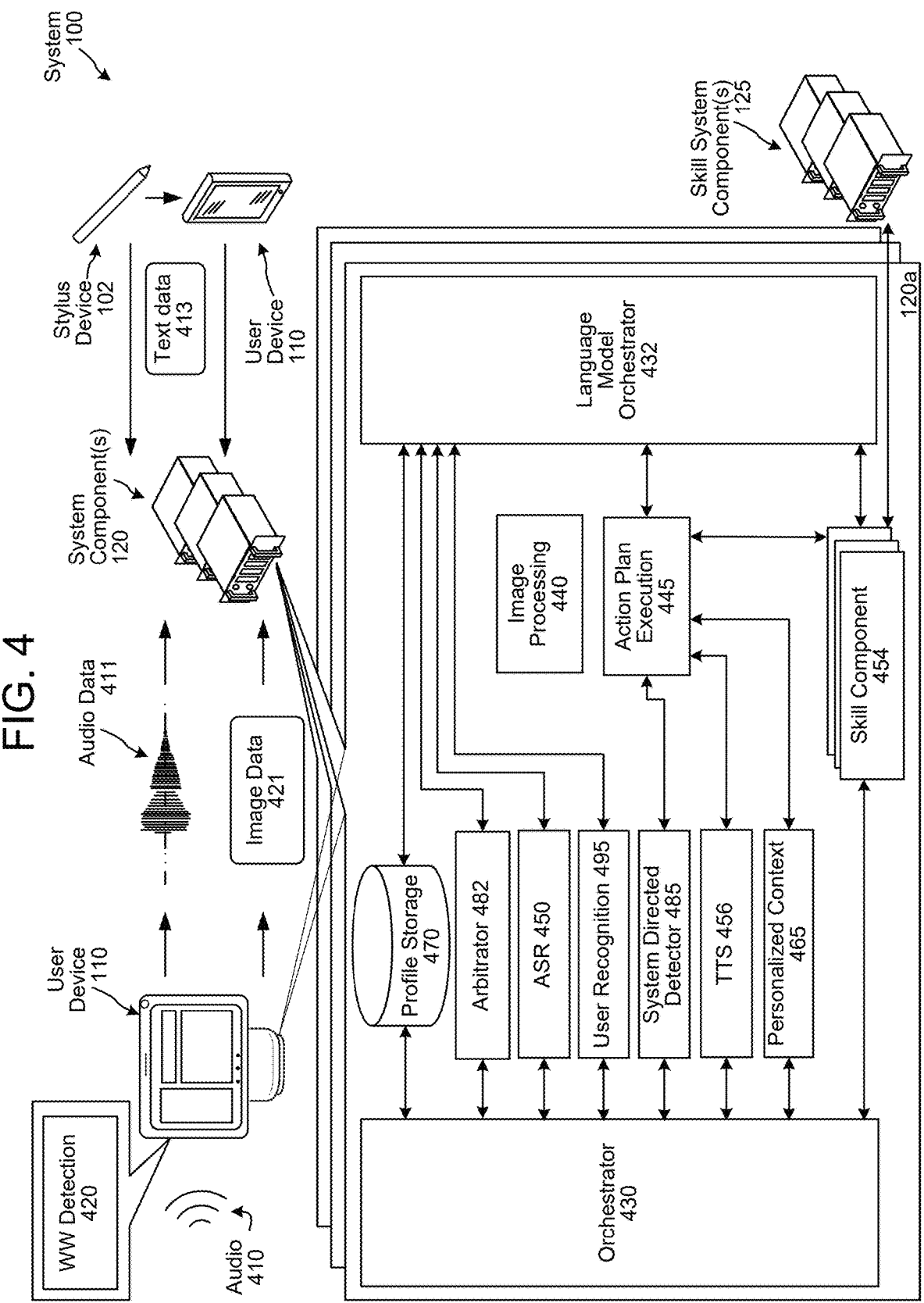
FIG. 4 illustrates system components for use in performing language processing, according to embodiments of the present disclosure.

The system 100 may operate using various components as described in FIG. 4. The various components may be located on same or different physical devices. Communication between various components may occur directly or across a network(s) 199. The user device 110 and/or stylus 102 may include audio capture component(s), such as a microphone 122 or array of microphones which captures audio 410 and creates corresponding audio data. Once speech is detected in audio data representing the audio 410, the user device 110 may determine if the speech is directed at the user device 110/system component(s). In at least some embodiments, such determination may be made using a wakeword detection component 420. The wakeword detection component 420 may be configured to detect various wakewords. In at least some examples, each wakeword may correspond to a name of a different digital assistant. An example wakeword/digital assistant name is "Alexa." In another example, input to the system may be in form of text data 413, for example as a result of a user typing an input into a user interface of user device 110. Other input forms may include indication that the user has pressed a physical or virtual button on user device 110, the user has made a gesture, etc. The user device 110 may also capture images using camera(s) of the user device 110 or of the stylus 102 such as described above and may send image data 421 representing those image(s) to the system component(s). (Although not illustrated in FIG. 4, image data 421 may be sent by stylus device 102.) The image data 421 may include raw image data or image data processed by the user device 110 before sending to the system component(s). The image data 421 may be used in various manners by different components of the system to perform operations such as determining whether a user is directing an utterance to the system, interpreting a user command, responding to a user command, performing OCR, object recognition, etc.

For example, upon receipt by the system component(s) 120, the image data 421 may be sent to an orchestrator component 430. The orchestrator component 430 may send the image data 421 to an image processing component 440. The image processing component 440 can perform computer vision functions such as object recognition, modeling, reconstruction, etc. For example, the image processing component 440 may detect a person, face, etc. (which may then be identified using user recognition component 495). The image processing component 440 is described in greater detail below with regard to FIG. 6.

The wakeword detection component 420 of the user device 110 may process the audio data, representing the audio 410, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 410, is analyzed to determine if specific characteristics of the audio data match preconfigured acoustic waveforms, audio signatures, or other data corresponding to a wakeword.

Thus, the wakeword detection component 420 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 420 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 420 and/or input is detected by an input detector, the user device 110 may "wake" and begin transmitting audio data 411, representing the audio 410, to the system component(s) 120. The audio data 411 may include data corresponding to the wakeword; in other embodiments, the portion of the audio corresponding to the wakeword is removed by the user device 110 prior to sending the audio data 411 to the system component(s) 120. In the case of touch input detection or gesture based input detection, the audio data may not include a wakeword.

In some implementations, the system 100 may include more than one system component(s). The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 420 may result in sending audio data to system component(s) a for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 454 of one or more system component(s) 120.

The user device 110/system component(s) may also include a system directed input detector 485. The system directed input detector 485 may be configured to determine whether an input to the system (for example speech, a gesture, etc.) is directed to the system or not directed to the system (for example directed to another user, etc.). The system directed input detector 485 may work in conjunction with the wakeword detection component 420. If the system directed input detector 485 determines an input is directed to the system, the user device 110 may "wake" and begin sending captured data for further processing. If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 485 determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 485 is determining whether an input is potentially device directed. For example, the system may output an orange indicator while considering an input, and may output a green indicator if a system directed input is detected. Other such configurations are possible.

Upon receipt by the system component(s) 120, the audio data 411 may be sent to an orchestrator component 430 and/or the language model orchestrator component 432. (Further operation of the language model orchestrator component is described below in reference to FIG. 5.) The orchestrator component 430 may include memory and logic that enables the orchestrator component 430 to transmit various pieces and forms of data to various components of the system, as well as perform other operations as described herein. In some embodiments, the orchestrator component 430 may optionally be included in the system component(s) 120. In embodiments where the orchestrator component 430 is not included in the system component(s) 120, the audio data 411 may be sent directly to the language model orchestrator component 432. Further, in such embodiments, each of the components of the system component(s) 120 may be configured to interact with the language model orchestrator component 432, the action plan execution component 445, and/or the application programming interface (API) provider component.

In some embodiments, the system component(s) 120 may include an arbitrator component 482, which may be configured to determine whether the orchestrator component 430 and/or the language model orchestrator component 432 are to process with respect to the audio data 411. In some embodiments, the language model orchestrator component 432 may be selected to process with respect to the audio data 411 only if the user 105 associated with the audio data 411 (or the user device 110 that captured the audio 410) has previously indicated that the language model orchestrator component 432 may be selected to process with respect to user inputs received from the user 105.

In some embodiments, the arbitrator component 482 may determine the orchestrator component 430 and/or the language model orchestrator component 432 are to process with respect to the audio data 411 based on metadata associated with the audio data 411. For example, the arbitrator component 482 may be a classifier configured to process a natural language representation of the audio data 411 (e.g., output by the ASR component 450) and classify the corresponding user input as to be processed by the orchestrator component 430 and/or the language model orchestrator component 432. For further example, the arbitrator component 482 may determine whether the device from which the audio data 411 is received is associated with an indicator representing the audio data 411 is to be processed by the orchestrator component 430 and/or the language model orchestrator component 432. As an even further example, the arbitrator component 482 may determine whether the user (e.g., determined using data output from the user recognition component 495) from which the audio data 411 is received is associated with a user profile including an indicator representing the audio data 411 is to be processed by the orchestrator component 430 and/or the language model orchestrator component 432. As another example, the arbitrator component 482 may determine whether the audio data 411 (or the output of the ASR component 450) corresponds to a request representing that the audio data 411 is to be processed by the orchestrator component 430 and/or the language model orchestrator component 432 (e.g., a request including "let's chat" may represent that the audio data 411 is to be processed by the language model orchestrator component 432).

In some embodiments, if the arbitrator component 482 is unsure (e.g., a confidence score corresponding to whether the orchestrator component 430 and/or the language model orchestrator component 432 is to process is below a threshold), then the arbitrator component 482 may send the audio data 411 to both of the orchestrator component 430 and the language model orchestrator component 432. In such embodiments, the orchestrator component 430 and/or the language model orchestrator component 432 may include further logic for determining further confidence scores during processing representing whether the orchestrator component 430 and/or the language model orchestrator component 432 should continue processing, as is discussed further herein below.

The arbitrator component 482 may send the audio data 411 to an ASR component 450. In some embodiments, the component selected to process the audio data 411 (e.g., the orchestrator component 430 and/or the language model orchestrator component 432) may send the audio data 411 to the ASR component 450. The ASR component 450 may transcribe the audio data 411 into text data. The text data output by the ASR component 450 represents one or more than one (e.g., in the form of an N-best list) ASR hypotheses representing speech represented in the audio data 411. The ASR component 450 interprets the speech in the audio data 411 based on a similarity between the audio data 411 and pre-established language models. For example, the ASR component 450 may compare the audio data 411 with models for sounds (e.g., acoustic units such as phonemes, senons, phones, etc.) and sequences of sounds to identify words that match the sequence of sounds of the speech represented in the audio data 411. The ASR component 450 sends the text data generated thereby to the arbitrator component 482, the orchestrator component 430, and/or the language model orchestrator component 432. In instances where the text data is sent to the arbitrator component 482, the arbitrator component 482 may send the text data to the component selected to process the audio data 411 (e.g., the orchestrator component 430 and/or the language model orchestrator component 432). The text data sent from the ASR component 450 to the arbitrator component 482, the orchestrator component 430, and/or the language model orchestrator component 432 may include a single top-scoring ASR hypothesis or may include an N-best list including multiple top-scoring ASR hypotheses. An N-best list may additionally include a respective score associated with each ASR hypothesis represented therein.

In some embodiments, the orchestrator component 430 may cause a NLU component (not shown) to perform processing with respect to the ASR data generated by the ASR component 450. The NLU component may attempt to make a semantic interpretation of the phrase(s) or statement(s) represented in the ASR data input therein by determining one or more meanings associated with the phrase(s) or statement(s) represented in the text data. The NLU component may determine an intent representing an action that a user desires be performed and may determine information that allows a device (e.g., the device 110, the system component(s) 120, a skill component 454, a skill system component(s) 125, etc.) to execute the intent. For example, if the ASR data corresponds to "play the 5th Symphony by Beethoven," the NLU component may determine an intent that the system output music and may identify "Beethoven" as an artist/composer and "5th Symphony" as the piece of music to be played. For further example, if the ASR data corresponds to "what is the weather," the NLU component may determine an intent that the system output weather information associated with a geographic location of the device 110. In another example, if the ASR data corresponds to "turn off the lights," the NLU component may determine an intent that the system turn off lights associated with the device 110 or the user 105. However, if the NLU component is unable to resolve the entity—for example, because the entity is referred to by anaphora such as "this song" or "my next appointment"—the system can send a decode request to another speech processing system for information regarding the entity mention and/or other context related to the utterance. The natural language processing system may augment, correct, or base results data upon the ASR data as well as any data received from the system.

The NLU component may return NLU results data (which may include tagged text data, indicators of intent, etc.) back to the orchestrator component 430. The orchestrator component 430 may forward the NLU results data to a skill component(s) 454. If the NLU results data includes a single NLU hypothesis, the NLU component and the orchestrator component 430 may direct the NLU results data to the skill component(s) 454 associated with the NLU hypothesis. If the NLU results data includes an N-best list of NLU hypotheses, the NLU component and the orchestrator component 430 may direct the top scoring NLU hypothesis to a skill component(s) 454 associated with the top scoring NLU hypothesis. The system may also include a post-NLU ranker which may incorporate other information to rank potential interpretations determined by the NLU component.

In some embodiments, after determining that the orchestrator component 430 and/or the language model orchestrator component 432 should process with respect to the user input data 527 (shown in FIG. 5 and which may include text data 413, audio data 411, and/or image data 421, such as that received from stylus device 102) or user device 110), the arbitrator 482 may be configured to periodically determine whether the orchestrator component 430 and/or the language model orchestrator component 432 should continue processing with respect to the user input data 527. For example, after a particular point in the processing of the orchestrator component 430 (e.g., after performing NLU, prior to determining a skill component 454 to process with respect to the user input data 527, prior to performing an action responsive to the user input, etc.) and/or the language model orchestrator component 432 (e.g., after selecting a task to be completed, after receiving the action response data from the one or more components, after completing a task, prior to performing an action responsive to the user input, etc.) the orchestrator component 430 and/or the language model orchestrator component 432 may query the arbitrator component 482 has determined that the orchestrator component 430 and/or the language model orchestrator component 432 should cease processing with respect to the user input data 527. As discussed above, the system 100 may be configured to stream portions of data associated with processing with respect to a user input to the one or more components such that the one or more components may begin performing their configured processing with respect to that data as soon as it is available to the one or more components. As such, the arbitrator component 482 may cause the orchestrator component 430 and/or the language model orchestrator component 432 to begin processing with respect to a user input as soon as a portion of data associated with the user input data 527 is available (e.g., the ASR data, personalized context data 567, output of the user recognition component 495, etc.). Thereafter, once the arbitrator component 482 has enough data to perform the processing described herein above to determine whether the orchestrator component 430 and/or the language model orchestrator component 432 is to process with respect to the user input, the arbitrator component 482 may inform the corresponding component (e.g., the orchestrator component 430 and/or the language model orchestrator component 432) to continue/cease processing with respect to the user input at one of the logical checkpoints in the processing of the orchestrator component 430 and/or the language model orchestrator component 432.

As discussed herein above, in some embodiments, the language model shortlister component 540 may be configured to select the orchestrator component 430 to process with respect to the user input and/or a current task to return action response data (e.g., the action response data 558a) representing a response to the user input/current task or a description of an action the orchestrator component 430 may cause to be performed in response to the user input/current task. As such, in some embodiments, although the language model orchestrator component 432 is determined to process with respect to a user input, the language model orchestrator component 432 may determine, during such processing, that the orchestrator component 430 should process with respect to the user input.

A skill system component(s) 125 may communicate with a skill component(s) 454 within the system component(s) 120 directly with the orchestrator component 430 and/or the action plan execution component 445, or with other components. A skill system component(s) 125 may be configured to perform one or more actions. An ability to perform such action(s) may sometimes be referred to as a "skill." That is, a skill may enable a skill system component(s) 125 to execute specific functionality in order to provide data or perform some other action requested by a user. For example, a weather service skill may enable a skill system component(s) 125 to provide weather information to the system component(s) 120, a car service skill may enable a skill system component(s) 125 to book a trip with respect to a taxi or ride sharing service, an order pizza skill may enable a skill system component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 454 dedicated to interacting with the skill system component(s) 125. Unless expressly stated otherwise, reference to a skill, skill device, or skill component may include a skill component 454 operated by the system component(s) 120 and/or skill operated by the skill system component(s) 125. Moreover, the functionality described herein as a skill or skill may be referred to using many different terms, such as an action, bot, app, or the like. The skill component 454 and or skill system component(s) 125 may return output data to the orchestrator component 430.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 456. The TTS component 456 may generate audio data (e.g., synthesized speech) from text data using one or more different methods. Text data input to the TTS component 456 may come from a skill component 454, the orchestrator component 430, or another component of the system. In one method of synthesis called unit selection, the TTS component 456 matches text data against a database of recorded speech. The TTS component 456 selects matching units of recorded speech and concatenates the units together to form audio data. In another method of synthesis called parametric synthesis, the TTS component 456 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 105 to request capture of image or video data. The user device 110 may process the commands locally or send audio data 411 representing the commands to the system component(s) 120 for processing, after which the system component(s) 120 may return output data that can cause the user device 110 to engage its camera.

The system component(s) 120/the user device 110 may include a user recognition component 495 that recognizes one or more users using a variety of data. However, the disclosure is not limited thereto, and the user device 110 may include the user recognition component 495 instead of and/or in addition to the system component(s) 120 without departing from the disclosure.

The user recognition component 495 may take as input the audio data 411 and/or text data output by the ASR component 450. The user recognition component 495 may perform user recognition by comparing audio characteristics in the audio data 411 to stored audio characteristics of users. The user recognition component 495 may also perform user recognition by comparing biometric data (e.g., fingerprint data, iris data, etc.), received by the system in correlation with the present user input, to stored biometric data of users assuming user permission and previous authorization. The user recognition component 495 may further perform user recognition by comparing image data (e.g., including a representation of at least a feature of a user), received by the system in correlation with the present user input, with stored image data including representations of features of different users. The user recognition component 495 may perform additional user recognition processes, including those known in the art.

The user recognition component 495 determines scores indicating whether user input originated from a particular user. For example, a first score may indicate a likelihood that the user input originated from a first user, a second score may indicate a likelihood that the user input originated from a second user, etc. The user recognition component 495 also determines an overall confidence regarding the accuracy of user recognition operations.

Output of the user recognition component 495 may include a single user identifier corresponding to the most likely user that originated the user input. Alternatively, output of the user recognition component 495 may include an N-best list of user identifiers with respective scores indicating likelihoods of respective users originating the user input. The output of the user recognition component 495 may be used to inform processing of the arbitrator component 482, the orchestrator component 430, and/or the language model orchestrator component 432 as well as processing performed by other components of the system.

The system component(s) 120/user device 110 may include a presence detection component that determines the presence and/or location of one or more users using a variety of data.

The system 100 (either on user device 110, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 470 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Although the components of FIG. 4 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure.

In at least some embodiments, the system component(s) may receive the audio data 411 from the user device 110, to recognize speech corresponding to a spoken input in the received audio data 411, and to perform functions in response to the recognized speech. In at least some embodiments, these functions involve sending directives (e.g., commands), from the system component(s) to the user device 110 (and/or other user devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) over the network(s) 199, some or all of the functions capable of being performed by the system component(s) may be performed by sending one or more directives over the network(s) 199 to the user device 110, which, in turn, may process the directive(s) and perform one or more corresponding actions. For example, the system component(s), using a remote directive that is included in response data (e.g., a remote response), may direct the user device 110 to output an audible response (e.g., using TTS processing performed by an on-device TTS component) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

In some embodiments, the user device 110 may include some or all of the components illustrated in FIG. 4 and/or discussed herein above with respect to the system component(s) 120. In other embodiments, the components illustrated in FIG. 4 and/or discussed herein with respect to the system component(s) 120 may be distributed across the user device 110 and the system component(s) 120.

In at least some embodiments, the components of the user device 110 (e.g., on-device components) may not have the same capabilities as the components of the system component(s). For example, on-device components may be configured to handle only a subset of the natural language user inputs that may be handled by the system component(s) 120. For example, such subset of natural language user inputs may correspond to local-type natural language user inputs, such as those controlling devices or components associated with a user's home. In such circumstances the on-device components may be able to more quickly interpret and respond to a local-type natural language user input, for example, than processing that involves the system component(s). If the user device 110 attempts to process a natural language user input for which the on-device components are not necessarily best suited, the language processing results determined by the user device 110 may indicate a low confidence or other metric indicating that the processing by the user device 110 may not be as accurate as the processing done by the system component(s).

In at least some embodiments, the user device 110 may include, or be configured to use, one or more skill components that may work similarly to the skill component(s) 454 implemented by the system component(s). The skill component(s) may correspond to one or more domains that are used in order to determine how to act on a spoken input in a particular way, such as by outputting a directive that corresponds to the determined intent, and which can be processed to implement the desired operation. The skill component(s) installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like. In one example, a skill component(s) 125 may include the image processing component 440 and may be configured to perform processing using image data 421, such as that captured by stylus device 102.

Additionally or alternatively, the user device 110 may be in communication with one or more skill system component(s) 125. For example, a skill system component(s) 125 may be located in a remote environment (e.g., separate location) such that the user device 110 may only communicate with the skill system component(s) 125 via the network(s) 199. However, the disclosure is not limited thereto. For example, in at least some embodiments, a skill system component(s) 125 may be configured in a local environment (e.g., home server and/or the like) such that the user device 110 may communicate with the skill system component(s) 125 via a private network, such as a local area network (LAN).

A skill system component(s) 125 may communicate with a skill component(s) 454 within the system component(s) 120 directly with the orchestrator component 430 and/or the action plan execution component 445, or with other components. A skill system component(s) 125 may be configured to perform one or more actions. An ability to perform such action(s) may sometimes be referred to as a "skill." That is, a skill may enable a skill system component(s) 125 to execute specific functionality in order to provide data or perform some other action requested by a user. For example, a weather service skill may enable a skill system component(s) 125 to provide weather information to the system component(s) 120, a car service skill may enable a skill system component(s) 125 to book a trip with respect to a taxi or ride sharing service, an order pizza skill may enable a skill system component(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 454 dedicated to interacting with the skill system component(s) 125. Unless expressly stated otherwise, reference to a skill, skill device, or skill component may include a skill component 454 operated by the system component(s) 120 and/or skill operated by the skill system component(s) 125. Moreover, the functionality described herein as a skill or skill may be referred to using many different terms, such as an action, bot, app, or the like. The skill component 454 and or skill system component(s) 125 may return output data to the orchestrator component 430.

The system component(s) 120 may include image processing component 440. The image processing component 440 may located across different physical and/or virtual machines. The image processing component 440 may receive and analyze image data (which may include single images or a plurality of images such as in a video feed). The image processing component 440 may work with other components of the system component(s) to perform various operations. For example the image processing component 440 may work with user recognition component 495 to assist with user recognition using image data. The image processing component 440 may also include or otherwise be associated with image data storage 670 which may store aspects of image data used by image processing component 440. The image data may be of different formats such as JPEG, GIF, BMP, MPEG, video formats, and the like.

Image matching algorithms, such as those used by image processing component 440, may take advantage of the fact that an image of an object or scene contains a number of feature points. Feature points are specific points in an image which are robust to changes in image rotation, scale, viewpoint or lighting conditions. This means that these feature points will often be present in both the images to be compared, even if the two images differ. These feature points may also be known as "points of interest." Therefore, a first stage of the image matching algorithm may include finding these feature points in the image. An image pyramid may be constructed to determine the feature points of an image. An image pyramid is a scale-space representation of the image, e.g., it contains various pyramid images, each of which is a representation of the image at a particular scale. The scale-space representation enables the image matching algorithm to match images that differ in overall scale (such as images taken at different distances from an object). Pyramid images may be smoothed and downsampled versions of an original image.

To build a database of object images, with multiple objects per image, a number of different images of an object may be taken from different viewpoints. From those images, feature points may be extracted and pyramid images constructed. Multiple images from different points of view of each particular object may be taken and linked within the database (for example within a tree structure described below). The multiple images may correspond to different viewpoints of the object sufficient to identify the object from any later angle that may be included in a user's query image. For example, a shoe may look very different from a bottom view than from a top view than from a side view. For certain objects, this number of different image angles may be 6 (top, bottom, left side, right side, front, back), for other objects this may be more or less depending on various factors, including how many images should be taken to ensure the object may be recognized in an incoming query image. With different images of the object available, it is more likely that an incoming image from a user may be recognized by the system and the object identified, even if the user's incoming image is taken at a slightly different angle.

This process may be repeated for multiple objects. For large databases, such as an online shopping database where a user may submit an image of an object to be identified, this process may be repeated thousands, if not millions of times to construct a database of images and data for image matching. The database also may continually be updated and/or refined to account for a changing catalog of objects to be recognized.

When configuring the database, pyramid images, feature point data, and/or other information from the images or objects may be used to cluster features and build a tree of objects and images, where each node of the tree will keep lists of objects and corresponding features. The tree may be configured to group visually significant subsets of images/features to ease matching of submitted images for object detection. Data about objects to be recognized may be stored by the system in image data 670, profile storage 470, or other storage component.

Figure 6:
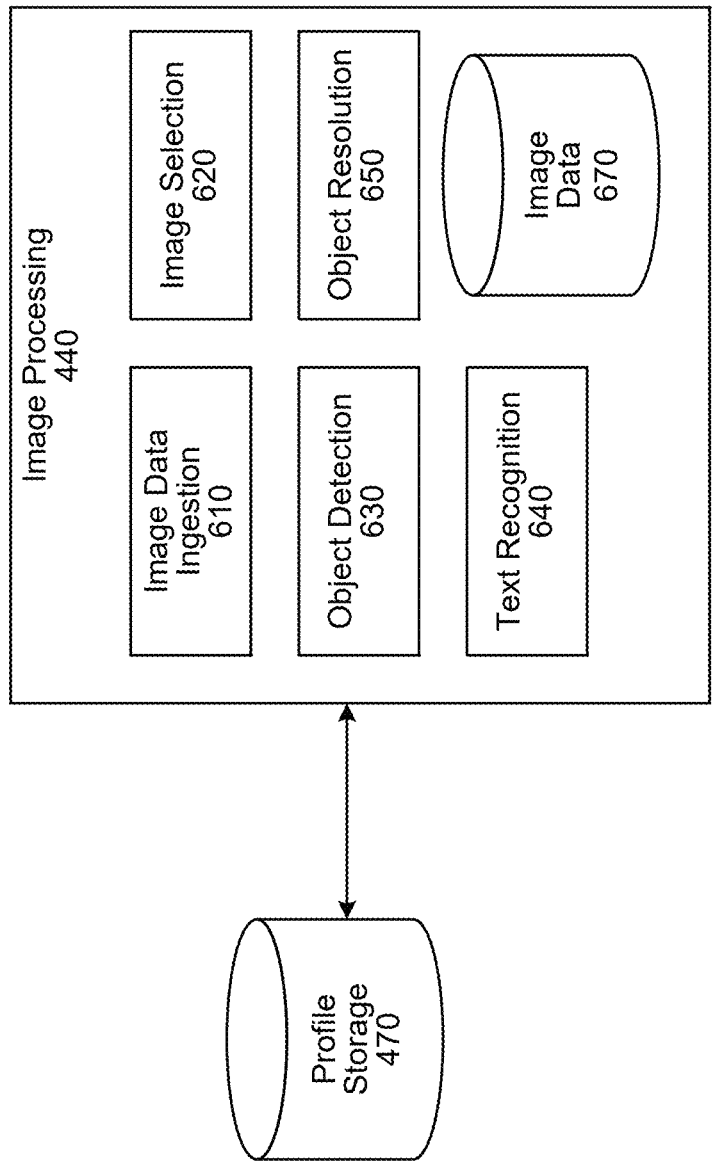
FIG. 6 is a conceptual diagram of components of an image processing component, according to embodiments of the present disclosure.

Image selection component 620 may select desired images from input image data to use for image processing at runtime. For example, input image data may come from a series of sequential images, such as a video stream where each image is a frame of the video stream. These incoming images need to be sorted to determine which images will be selected for further object recognition processing as performing image processing on low quality images may result in an undesired user experience. To avoid such an undesirable user experience, the time to perform the complete recognition process, from first starting the video feed to delivering results to the user, should be as short as possible. As images in a video feed may come in rapid succession, the image processing component 440 may be configured to select or discard an image quickly so that the system can, in turn, quickly process the selected image and deliver results to a user. The image selection component 620 may select an image for object recognition by computing a metric/feature for each frame in the video feed and selecting an image for processing if the metric exceeds a certain threshold. While FIG. 6 illustrates image selection component 620 as part of system component(s), it may also be located on device 110 so that the device may select only desired image(s) to send to system component(s), thus avoiding sending too much image data to system component(s) (thus expending unnecessary computing/communication resources). Thus the device may select only the best quality images for purposes of image analysis.

The metrics used to select an image may be general image quality metrics (focus, sharpness, motion, etc.) or may be customized image quality metrics. The metrics may be computed by software components or hardware components. For example, the metrics may be derived from output of device sensors such as a gyroscope, accelerometer, field sensors, inertial sensors, camera metadata, or other components. The metrics may thus be image based (such as a statistic derived from an image or taken from camera metadata like focal length or the like) or may be non-image based (for example, motion data derived from a gyroscope, accelerometer, GPS sensor, etc.). As images from the video feed are obtained by the system, the system, such as a device, may determine metric values for the image. One or more metrics may be determined for each image. To account for temporal fluctuation, the individual metrics for each respective image may be compared to the metric values for previous images in the image feed and thus a historical metric value for the image and the metric may be calculated. This historical metric may also be referred to as a historical metric value. The historical metric values may include representations of certain metric values for the image compared to the values for that metric for a group of different images in the same video feed. The historical metric(s) may be processed using a trained classifier model to select which images are suitable for later processing.

For example, if a particular image is to be measured using a focus metric, which is a numerical representation of the focus of the image, the focus metric may also be computed for the previous N frames to the particular image. N is a configurable number and may vary depending on system constraints such as latency, accuracy, etc. For example, N may be 30 image frames, representing, for example, one second of video at a video feed of 30 frames-per-second. A mean of the focus metrics for the previous N images may be computed, along with a standard deviation for the focus metric. For example, for an image number X+1 in a video feed sequence, the previous N images, may have various metric values associated with each of them. Various metrics such as focus, motion, and contrast are discussed, but others are possible. A value for each metric for each of the N images may be calculated, and then from those individual values, a mean value and standard deviation value may be calculated. The mean and standard deviation (STD) may then be used to calculate a normalized historical metric value, for example STD (metric)/MEAN (metric). Thus, the value of a historical focus metric at a particular image may be the STD divided by the mean for the focus metric for the previous N frames. For example, historical metrics (HIST) for focus, motion, and contrast may be expressed as:

$$HIST_{Focus} = \frac{STD_{Focus}}{MEAN_{Focus}}$$

$$HIST_{Motion} = \frac{STD_{Motion}}{MEAN_{Motion}}$$

$$HIST_{Contrast} = \frac{STD_{Contrast}}{MEAN_{Contrast}}$$

In one embodiment the historical metric may be further normalized by dividing the above historical metrics by the number of frames N, particularly in situations where there are small number of frames under consideration for the particular time window. The historical metrics may be recalculated with each new image frame that is received as part of the video feed. Thus each frame of an incoming video feed may have a different historical metric from the frame before. The metrics for a particular image of a video feed may be compared historical metrics to select a desirable image on which to perform image processing.

Image selection component 620 may perform various operations to identify potential locations in an image that may contain recognizable text. This process may be referred to as glyph region detection. A glyph is a text character that has yet to be recognized. If a glyph region is detected, various metrics may be calculated to assist the eventual optical character recognition (OCR) process. For example, the same metrics used for overall image selection may be re-used or recalculated for the specific glyph region. Thus, while the entire image may be of sufficiently high quality, the quality of the specific glyph region (i.e. focus, contrast, intensity, etc.) may be measured. If the glyph region is of poor quality, the image may be rejected for purposes of text recognition.

Image selection component 620 may generate a bounding box that bounds a line of text. The bounding box may bound the glyph region. Value(s) for image/region suitability metric(s) may be calculated for the portion of the image in the bounding box. Value(s) for the same metric(s) may also be calculated for the portion of the image outside the bounding box. The value(s) for inside the bounding box may then be compared to the value(s) outside the bounding box to make another determination on the suitability of the image. This determination may also use a classifier.

Additional features may be calculated for determining whether an image includes a text region of sufficient quality for further processing. The values of these features may also be processed using a classifier to determine whether the image contains true text character/glyphs or is otherwise suitable for recognition processing. To locally classify each candidate character location as a true text character/glyph location, a set of features that capture salient characteristics of the candidate location is extracted from the local pixel pattern. Such features may include aspect ratio (bounding box width/bounding box height), compactness ($4*\pi*$ candidate glyph area/(perimeter) 2), solidity (candidate glyph area/bounding box area), stroke-width to width ratio (maximum stroke width/bounding box width), stroke-width to height ratio (maximum stroke width/bounding box height), convexity (convex hull perimeter/perimeter), raw compactness ($4*\pi*$ (candidate glyph number of pixels)/(perimeter) 2), number of holes in candidate glyph, or other features. Other candidate region identification techniques may be used. For example, the system may use techniques involving maximally stable extremal regions (MSERs). Instead of MSERs (or in conjunction with MSERs), the candidate locations may be identified using histogram of oriented gradients (HoG) and Gabor features.

If an image is sufficiently high quality it may be selected by image selection 620 for sending to another component (e.g., from device to system component(s)) and/or for further processing, such as text recognition, object detection/resolution, etc.

The feature data calculated by image selection component 620 may be sent to other components such as text recognition component 640, objection detection component 630, object resolution component 650, etc. so that those components may use the feature data in their operations. Other preprocessing operations such as masking, binarization, etc. may be performed on image data prior to recognition/resolution operations. Those preprocessing operations may be performed by the device prior to sending image data or by system component(s).

Object detection component 630 may be configured to analyze image data to identify one or more objects represented in the image data. Various approaches can be used to attempt to recognize and identify objects, as well as to determine the types of those objects and applications or actions that correspond to those types of objects, as is known or used in the art. For example, various computer vision algorithms can be used to attempt to locate, recognize, and/or identify various types of objects in an image or video sequence. Computer vision algorithms can utilize various different approaches, as may include edge matching, edge detection, recognition by parts, gradient matching, histogram comparisons, interpretation trees, and the like.

The object detection component 630 may process at least a portion of the image data to determine feature data. The feature data is indicative of one or more features that are depicted in the image data. For example, the features may be face data, or other objects, for example as represented by stored data in profile storage 470. Other examples of features may include shapes of body parts or other such features that identify the presence of a human. Other examples of features may include edges of doors, shadows on the wall, texture on the walls, portions of artwork in the environment, and so forth to identify a space. The object detection component 630 may compare detected features to stored data (e.g., in profile storage 470, image data 670, or other storage) indicating how detected features may relate to known objects for purposes of object detection.

Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

One statistical algorithm that may be used for geometric matching of images is the Random Sample Consensus (RANSAC) algorithm, although other variants of RANSAC-like algorithms or other statistical algorithms may also be used. In RANSAC, a small set of putative correspondences is randomly sampled. Thereafter, a geometric transformation is generated using these sampled feature points. After generating the transformation, the putative correspondences that fit the model are determined. The putative correspondences that fit the model and are geometrically consistent and called "inliers." The inliers are pairs of feature points, one from each image, that may correspond to each other, where the pair fits the model within a certain comparison threshold for the visual (and other) contents of the feature points, and are geometrically consistent (as explained below relative to motion estimation). A total number of inliers may be determined. The above mentioned steps may be repeated until the number of repetitions/trials is greater than a predefined threshold or the number of inliers for the image is sufficiently high to determine an image as a match (for example the number of inliers exceeds a threshold). The RANSAC algorithm returns the model with the highest number of inliers corresponding to the model.

To further test pairs of putative corresponding feature points between images, after the putative correspondences are determined, a topological equivalence test may be performed on a subset of putative correspondences to avoid forming a physically invalid transformation. After the transformation is determined, an orientation consistency test may be performed. An offset point may be determined for the feature points in the subset of putative correspondences in one of the images. Each offset point is displaced from its corresponding feature point in the direction of the orientation of that feature point. The transformation is discarded based on orientation of the feature points obtained from the feature points in the subset of putative correspondences if any one of the images being matched and its offset point differs from an estimated orientation by a predefined limit.

Subsequently, motion estimation may be performed using the subset of putative correspondences which satisfy the topological equivalence test.

Motion estimation (also called geometric verification) may determine the relative differences in position between corresponding pairs of putative corresponding feature points. A geometric relationship between putative corresponding feature points may determine where in one image (e.g., the image input to be matched) a particular point is found relative to that potentially same point in the putatively matching image (i.e., a database image). The geometric relationship between many putatively corresponding feature point pairs may also be determined, thus creating a potential map between putatively corresponding feature points across images. Then the geometric relationship of these points may be compared to determine if a sufficient number of points correspond (that is, if the geometric relationship between point pairs is within a certain threshold score for the geometric relationship), thus indicating that one image may represent the same real-world physical object, albeit from a different point of view. Thus, the motion estimation may determine that the object in one image is the same as the object in another image, only rotated by a certain angle or viewed from a different distance, etc.

The above processes of image comparing feature points and performing motion estimation across putative matching images may be performed multiple times for a particular query image to compare the query image to multiple potential matches among the stored database images. Dozens of data comparisons may be performed before one (or more) satisfactory matches that exceed the relevant thresholds (for both matching feature points and motion estimation) may be found. The thresholds may also include a confidence threshold, which compares each potential matching image with a confidence score that may be based on the above processing. If the confidence score exceeds a certain high threshold, the system may stop processing additional candidate matches and simply select the high confidence match as the final match. Or if, the confidence score of an image is within a certain range, the system may keep the candidate image as a potential match while continuing to search other database images for potential matches. In certain situations, multiple database images may exceed the various matching/confidence thresholds and may be determined to be candidate matches. In this situation, a comparison of a weight or confidence score may be used to select the final match, or some combination of candidate matches may be used to return results. The system may continue attempting to match an image until a certain number of potential matches are identified, a certain confidence score is reached (either individually with a single potential match or among multiple matches), or some other search stop indicator is triggered. For example, a weight may be given to each object of a potential matching database image. That weight may incrementally increase if multiple query images (for example, multiple frames from the same image stream) are found to be matches with database images of a same object. If that weight exceeds a threshold, a search stop indicator may be triggered and the corresponding object selected as the match.

Once an object is detected by object detection component 630 the system may determine which object is actually seen using object resolution component 650. Thus one component, such as object detection component 630, may detect if an object is represented in an image while another component, object resolution component 650 may determine which object is actually represented. Although illustrated as separate components, the system may also be configured so that a single component may perform both object detection and object resolution.

For example, when a database image is selected as a match to the query image, the object in the query image may be determined to be the object in the matching database image. An object identifier associated with the database image (such as a product ID or other identifier) may be used to return results to a user, along the lines of "I see you holding object X" along with other information, such giving the user information about the object. If multiple potential matches are returned (such as when the system can't determine exactly what object is found or if multiple objects appear in the query image) the system may indicate to the user that multiple potential matching objects are found and may return information/options related to the multiple objects.

In another example, object detection component 630 may determine that a type of object is represented in image data and object resolution component 650 may then determine which specific object is represented. The object resolution component 650 may also make available specific data about a recognized object to further components so that further operations may be performed with regard to the resolved object.

Object detection component 630 may be configured to process image data to detect a representation of an approximately two-dimensional (2D) object (such as a piece of paper) or a three-dimensional (3D) object (such as a face). Such recognition may be based on available stored data (e.g., 470, 670, etc.) which in turn may have been provided through an image data ingestion process managed by image data ingestion component 610. Various techniques may be used to determine the presence of features in image data. For example, one or more of a Canny detector, Sobel detector, difference of Gaussians, features from accelerated segment test (FAST) detector, scale-invariant feature transform (SIFT), speeded up robust features (SURF), color SIFT, local binary patterns (LBP), trained convolutional neural network, or other detection methodologies may be used to determine features in the image data. A feature that has been detected may have an associated descriptor that characterizes that feature. The descriptor may comprise a vector value in some implementations. For example, the descriptor may comprise data indicative of the feature with respect to many (e.g., 256) different dimensions.

Various techniques may be used to train and operate models to perform various steps described herein, such as user recognition, sentiment detection, image processing, dialog management, natural language processing, etc. Models may be trained and operated according to various machine learning techniques. Such techniques may be used for trained models such as, neural networks, deep neural networks, recurrent neural networks, language models, LLMs, generative models, inference engines, trained classifiers, discriminative models, probabilistic models, etc. Examples of trained classifiers include Support Vector Machines (SVMs), neural networks, decision trees, AdaBoost (short for "Adaptive Boosting") combined with decision trees, and random forests.

Example supervised learning techniques may involve learning algorithms that analyze data and recognize patterns in the data, and which are commonly used for classification and regression analysis. Given a set of training examples, each marked as belonging to one of two categories, a training algorithm builds a trained model that assigns new examples into one category or the other, making it a nonprobabilistic binary linear classifier. Other trained models may be built with the training set identifying more than two categories, with the trained model determining which category is most similar to input data. A trained model may be mapped so that the examples of the separate categories are divided/separated by distinctive gaps. New examples/inputs are then mapped into that same space and predicted to belong to a category based on which side of the gaps they fall on. Some trained models may issue a "score" indicating which category the input data most closely matches. The score may provide an indication of how closely the data matches the category.

Training a machine-based model component such as, generative models, discriminative models, etc., may require establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, unsupervised learning, finetuning learning, reinforcement learning, stochastic learning, or other known techniques.

Figure 5:
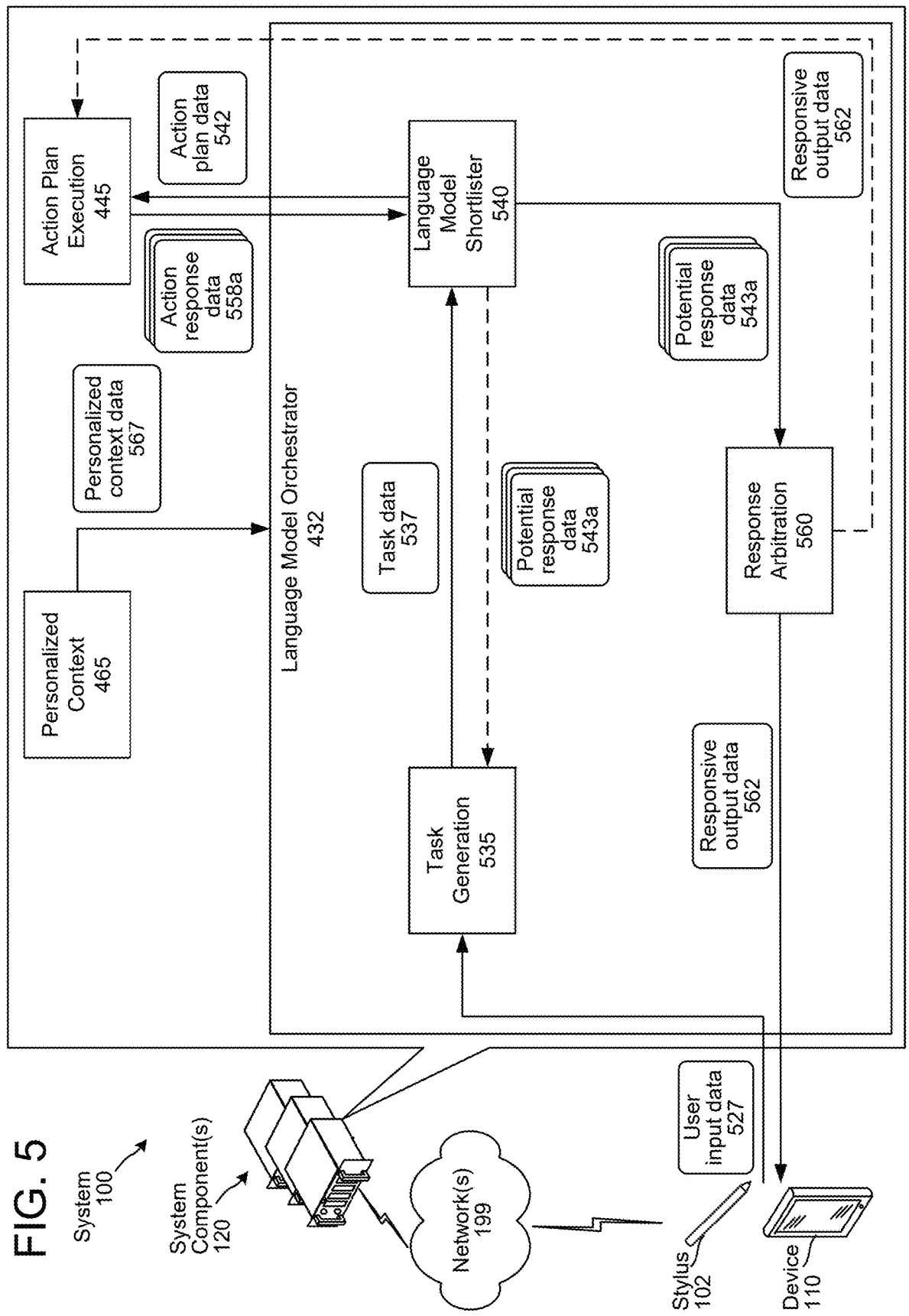
FIG. 5 illustrates system components for use in performing language processing using a language model orchestrator, according to embodiments of the present disclosure.

FIG. 5 illustrates further example components included in the system 100 configured to determine an action responsive to a user input.

The system component(s) 120 may include various components, such as a language model orchestrator component 432, a personalized context component 465, and an action plan execution component 445. The language model orchestrator component 432 may include a task generation component 535, a language model shortlister component 540, and a response arbitration component 560.

In some embodiments, the language model orchestrator component 432 may generate prompt data representing a prompt for input to the language models. As shown in FIG. 5, the system component(s) 120 receive user input data 527, which may be provided to the language model orchestrator component 432. In some instances, the user input data 527 may correspond to various data types, such as text (e.g., a text or tokenized representation of a user input), audio, image, video, etc. For example, the user input data may include input text (or tokenized) data when the user input is a typed natural language user input. The text data of user input data 527 may come from a stylus device 102, for example as a result of the stylus device 102 converting sensor movement information or light/image information resulting from handwriting motions to text data. The text data of user input data 527 may also come from a user device 110 (or other component/device) which may receive sensor movement information from stylus 102 and may convert that sensor movement information into text data. For further example, prior to the language model orchestrator component 432 receiving the user input data 527, another component (e.g., an automatic speech recognition (ASR) component 450) of the system 100 may receive audio data representing the user input. The ASR component 450 may perform ASR processing on the audio data to determine ASR data corresponding to the user input, which may correspond to a transcript of the user input. As described below, with respect to FIG. 4, the ASR component 450 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 450 level of confidence that the corresponding hypothesis represents what the user said. The ASR component 450 may also determine token scores corresponding to each token/word of the ASR hypothesis, where the token score indicates the ASR component's 450 level of confidence that the respective token/word was spoken by the user. The token scores may be identified as an entity score when the corresponding token relates to an entity. In some instances, the user input data 527 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 527).

In some embodiments, the language model orchestrator component 432 may receive input data, which may be processed in a similar manner as the user input data 527 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the user device 110, a user entering the home, etc.). In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100 may process the input data and may perform an action. For example, in response to detecting a garage door opening, the system 100 may cause garage lights to turn on, living room lights to turn on, etc. As another example, in response to detecting an oven beeping, the system 100 may cause a user device 110 (e.g., a smartphone, a smart speaker, etc.) to present an alert to the user. The language model orchestrator component 432 may process the input data to generate tasks that may cause the foregoing example actions to be performed.

The user input data 527 may be received at the task generation component 535 of the language model orchestrator component 432, which may be configured to generate a list of (e.g., one or more) tasks (e.g., steps/actions) that are to be completed in order to perform an action responsive to the user input and select a task of the list of the tasks that is to be completed first (e.g., in a current iteration of processing by the system 100), as described in detail herein. For example, for a user input of "What is the weather for today," the task generation component 535 may generate a list of tasks of "(1) determine current outside temperature from thermostat; and (2) determine weather forecast for today" and select the task of "determine weather forecast for today" to be completed first. In instances where the task generation component 535 generates more than one task to be completed in order to perform the action responsive to the user input, the task generation component 535 may further maintain and prioritize the list of tasks as the processing of the system 100 with respect to the user input is performed. In other words, as the system 100 processes to complete the list of tasks, the task generation component 535 may (1) incorporate the potential responses associated with completed tasks into data provided to other components of the system 100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed.

In some embodiments, the task generation component 535 may process as described above using language model(s) (e.g., LLMs). For example, the task generation component 535 may include a language model (e.g., and LLM) configured to generate the list of tasks that are to be completed in order to perform the action responsive to the user input and select a task of the list of tasks that is to be completed first. In some such embodiments, the user input data 527 may be received at a prompt generation component configured to generate a prompt for input to the language model. The prompt may include the user input data 527 and various other information usable by the language model to generate the list of tasks that are to be completed in order to perform the action responsive to the user input (e.g., an indication of a remaining task(s) to be completed with respect to the user input, an indication of a potential response(s) associated with a completed task(s), and/or various contextual signals associated with the user input. The prompt may be a directive for the language model to determine the list of tasks given the information included in the prompt. The language model may process the prompt to generate the list of tasks.

The task generation component 535 may generate and send task data 537 representing the selected task to be completed and various other information needed to perform further processing with respect to the task (e.g., the user input data 527, an indication of the selected task, potential responses associated with previous tasks, the remaining task(s), and personalized context data 567 associated with the user input data 527, as described in detail herein) to the language model shortlister component 540.

Application programming interfaces (APIs) are a way for one program/component to interact with another. API calls are the medium by which they interact. An API call, or API request, is a message sent to a system component asking an API to perform an action, provide a service or information, or the like. An API call may be formatted for the particular API and may include a particular request, optionally using particular arguments and argument values. API calls may be used for a variety of purposes, such as controlling other devices (e.g., an API call of turn_on_device (device="indoor light 1") corresponds to a directive/request to a component to turn on a device associated with the identifier "indoor light 1"), obtaining information from other components (e.g., an API call of InfoQA.question ("Who is the president of USA?") corresponds to a directive/request to a component to find and provide an answer to the indicated question), and performing other actions (e.g., generating synthesized speech, searching data sources, etc.).

In some embodiments, the system may include an API retrieval component configured to receive a search query and output one or more API calls (or API data) matching the search query. API data may include an API call, API description, component description, and other information associated with the API call. In some embodiments, a language model of the system may generate an action to be performed with respect to the user input, where the action may be represented as an action description, an API, an API description, etc. Based on the generated action, the system may use the API retrieval component to determine one or more APIs available to perform the generated action. For example, in response to the user input "book a flight", the language model may generate the action "I need to find an API to book flight" or "I need to book a flight using Book.flight ([Departure], [Arrival])." Based on the generated action, the system may search the API retrieval component to determine one or more API calls corresponding to booking a flight (e.g., Bookflight.location ("departing airport code", "arrival airport code"), Bookflight.date ("departing date"), bookflight.roundtrip ("departing location", "arrival location", "departure date", "return date"), AirlineBookFlight ("departing airport code", "arrival airport code"), etc.). Based on the user input and other information (e.g., context data corresponding to the user input, user preferences, past user interactions, further information received from user, etc.), the system may select one or more of the determined API calls to execute.

The language model shortlister component 540 may be configured to determine one or more components (e.g., a responding component, such as APIs, skill component(s), language model (e.g., LLM) agent component(s), a TTS component, etc. as discussed herein) configured to perform an action related to the user input or the current task. The language model shortlister component 540 may further be configured to generate and cause the execution of a request(s) (e.g., an API call(s), an incomplete API call/API call format, an indication of an action to be performed by a component, etc.) for the one or more components to provide a potential responses(s) to the user input or current task (e.g., a response to a user-provided question, a paragraph from a website, etc.), which may further include a potential action (e.g., a description of a potential action, such as turning on a light, booking a flight ticket, ordering a pizza, etc.) the components are configured to/will perform with respect to the user input or the current task). For example, for a current task of "determine weather forecast for today," the language model shortlister component 540 may generate requests of "use Weather Application A to determine weather forecast for today" and "use Weather Application B to determine weather forecast for today," or the like.

In some embodiments, the language model shortlister component 540 may process as described above using a language model(s) (e.g., LLMs). For example, the language model shortlister component 540 may include a language model (e.g., an LLM) configured to determine one or more components configured to perform an action related to the user input or the current task and cause the execution of a request(s) for the component(s) to provide a potential response(s) to the user input or current task. In some such embodiments, the task data 537 may be received at a prompt generation component configured to generate a prompt for input to the language model. The prompt may include the task data 537 and an indication of component(s) (e.g., APIs) determined to be relevant to the current task/the user input. The prompt may be a directive for the language model to generate a request for a component(s) (of the components determined to be relevant) to provide a potential response(s) to the user input or current task given the information included in the prompt. The language model may process the prompt to generate the request(s).

Such requests may be represented in the action plan data 542 sent to the action plan execution component 445. The action plan execution component 445 may identify the request(s) in the action plan data 542, generate executable API calls corresponding to the request(s), and cause the corresponding components (e.g., the responding component(s)) to generate action response data 558*a-n* representing the requested potential response(s), where individual action response data 558*a* may be provided by/correspond to a particular responding component. In some embodiments, the action response data 558*a-n* may include an identifier (e.g., a component name, an alphanumerical value associated with the component, etc.) for the component providing the data. The language model shortlister component 540 receives and processes the action response data 558*a-n* and generates potential response data 543*a-n* representing the potential response(s) (e.g., relevant potential responses, selected potential responses, ranked potential responses, etc.) for further processing (e.g., as described in detail herein). If the language model shortlister component 540 determines that there are no remaining tasks to generate potential responses for, the language model shortlister component 540 may send the potential response data 543*a-n* to the response arbitration component 560.

The potential response data 543*a-n*, in some embodiments, may be determined based on receiving potential responses from various different components that may be relevant in responding to the user input data 527. For example, the potential response data 543*a-n* may include a first potential response from a first component configured to perform a first task determined by the task generation component 535, a second potential response from a second component configured to perform a second task determined by the task generation component 535, etc. The potential response data 543*a-n* can include more than one potential response relating to an individual task. In some embodiments, the potential response data 543*a-n* may be natural language data.

The response arbitration component 560 processes the potential response data 543*a-n* to determine whether the potential responses generated for the task(s) are responsive to the user input. The response arbitration component 560 processes the potential response data 543*a-n* (representing at least the generated potential responses) and selects one or more of the potential responses that are determined to be responsive to the user input and/or determines that none of the actions are responsive to the user input. For example, the response arbitration component 560 may process the potential response data 543*a-n* to determine if one or more of the potential responses performable by the API(s) (e.g., the potential responses and/or potential actions) are responsive to the current task. In some embodiments, the response arbitration component 560 may generate a natural language summary of one or more of the selected responses and output the natural language summary. For example, for a user input of "what is the weather for today" and potential responses of "The weather for today is a high of 75 and a low of 68" and "The weather for today is mostly sunny with a slight chance of rain in the evening," the response arbitration component 560 may generate a natural language summary of "The weather for today is expected to be mostly sunny with a high of 75 and a low of 68 and a slight chance of rain in the evening," or the like.

In some embodiments, the response arbitration component 560 may process as described above using language model(s) (e.g., LLMs). For example, the response arbitration component 560 may include a language model (e.g., an LLM) configured to generate a response to the user input (represented by responsive data 562) using one or more of the potential responses that are determined to be responsive to the user input and/or determines that none of the potential responses are responsive to the user input. In some such embodiments, the user input data 527 and the potential responses (and in some embodiments, the contextual signals associated with the user input) may be received at a prompt generation component configured to generate a prompt for input to the language model including the information. The prompt may be a directive for the language model to, given the information included in the prompt, generate a response to the user input using one or more of the potential responses that are determined to be responsive to the user input and/or indicate that none of the potential responses are responsive to the user input. The language model may process the prompt to generate the response to the user input or the indication that none of the potential response are responsive to the user input. In instances where the language model generate the indication that none of the potential responses are responsive to the user input, the indication may further include a request for information to be output to the user (and/or provided to another component of the system configured to determine the information).

The output generated by the response arbitration component 560 (e.g., responsive output data 562) may be provided to one or more components of the system 100 (e.g., the TTS component 456, a visual output component, etc. via, for example, the action plan execution component 445) and/or sent to the device 110 for output to the user.

Figure 7:
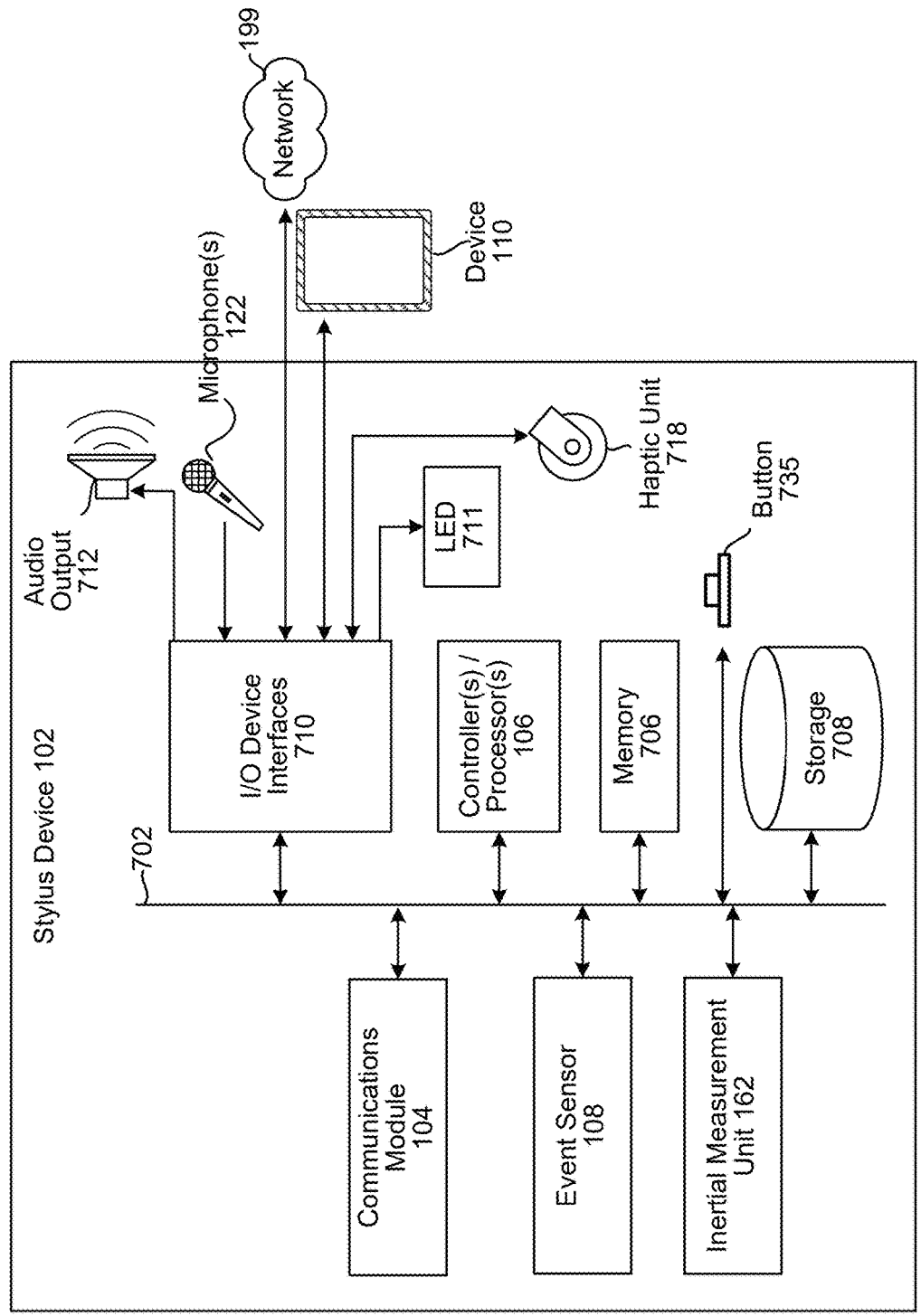
FIG. 7 is a block diagram conceptually illustrating example components of a stylus device, according to embodiments of the present disclosure.

FIG. 7 is a block diagram conceptually illustrating example components of the stylus device 102. In operation, the stylus device 102 may include computer-readable and computer-executable instructions that reside on the stylus device 102 to perform various operations, for example communicating between the stylus 102 and the touchscreen device 110.

As illustrated in FIG. 7, the stylus device 102 may include an address/data bus 702 for conveying data among components of the stylus device 102. Each component within the stylus device 102 may also be directly connected to other components in addition to (or instead of) being connected to other components across the bus 702.

The stylus device 102 may include one or more microcontrollers/controllers/processors 106 that may each include a central processing unit (CPU) for processing data and computer-readable instructions, and a memory 706 for storing data and instructions. The stylus device 102 may include IMU 162. The memory 706 may include volatile random access memory (RAM), non-volatile read only memory (ROM), non-volatile magnetoresistive (MRAM) and/or other types of memory. The stylus device 102 may also include a data storage component 708, for storing data and microcontrollers/controller/processor-executable instructions (e.g., instructions to perform communications using the communications module 104). The data storage component 708 may include one or more non-volatile storage types such as magnetic storage, optical storage, solid-state storage, etc. The stylus device 102 may also be connected to removable or external non-volatile memory and/or storage (such as a removable memory card, memory key drive, networked storage, etc.) through input/output device interfaces 710.

Instructions for operating the stylus device 102 and its various components may be executed by the microcontroller(s)/controller(s)/processor(s) 106, using the memory 706 as temporary "working" storage at runtime. The instructions may be stored in a non-transitory manner in non-volatile memory 706, storage 708, or an external device. Alternatively, some or all of the executable instructions may be embedded in hardware or firmware in addition to or instead of software.

The stylus device 102 includes input/output device interfaces 710. A variety of components may be connected through the input/output device interfaces 710, such as an audio output device for producing sound, such as speaker(s) 712; a light emitting diode (LED) 711; a haptic unit 718; and/or other components, such as, one or more audio capture device(s), such as a microphone 122 or an array of microphones, and/or other components (not illustrated). The speaker(s) 712, the LED 711, the haptic unit 718 and other components may be integrated into the stylus device 102 or may be separate.

The input/output device interfaces 710 may also include an antenna (not shown) to connect one or more networks 199, such as a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. The computing device 110 and the stylus device 102 may communicate using electromagnetic communications (for example, electric fields generated by each device to transmit data on a carrier frequency), and/or haptic communications.

The stylus device 102 may include a button 735 which may include a physical button or other touch sensitive component. The stylus device 102 may be configured so that pressing or interacting with button 735 may perform a variety of actions such as beginning light emission/capture, audio capture, object recognition, writing/language capture and/or processing, or the like depending on configuration of the stylus device 102.

The stylus device 102 may include a communication module 104 that coordinates electromagnetic communications between the stylus 102 and device 110. The communication module 104 may include circuitry and components such as an instrumentation amplifier and a low leakage single-pole single-throw (SPST) switch, one or more resisters, one or more noise filtering components, such as a band pass filter and an automatic gain controller, and/or other components to provide a communication interface between a touch controller of a computing device 110 and the stylus device 102. Communications between the stylus device 102 and the computing device 110 may be through capacitive communications between the stylus 102 and the device 110, for example through electronic signals exchanged between components of a touchscreen and the tip 114.

Figure 8:
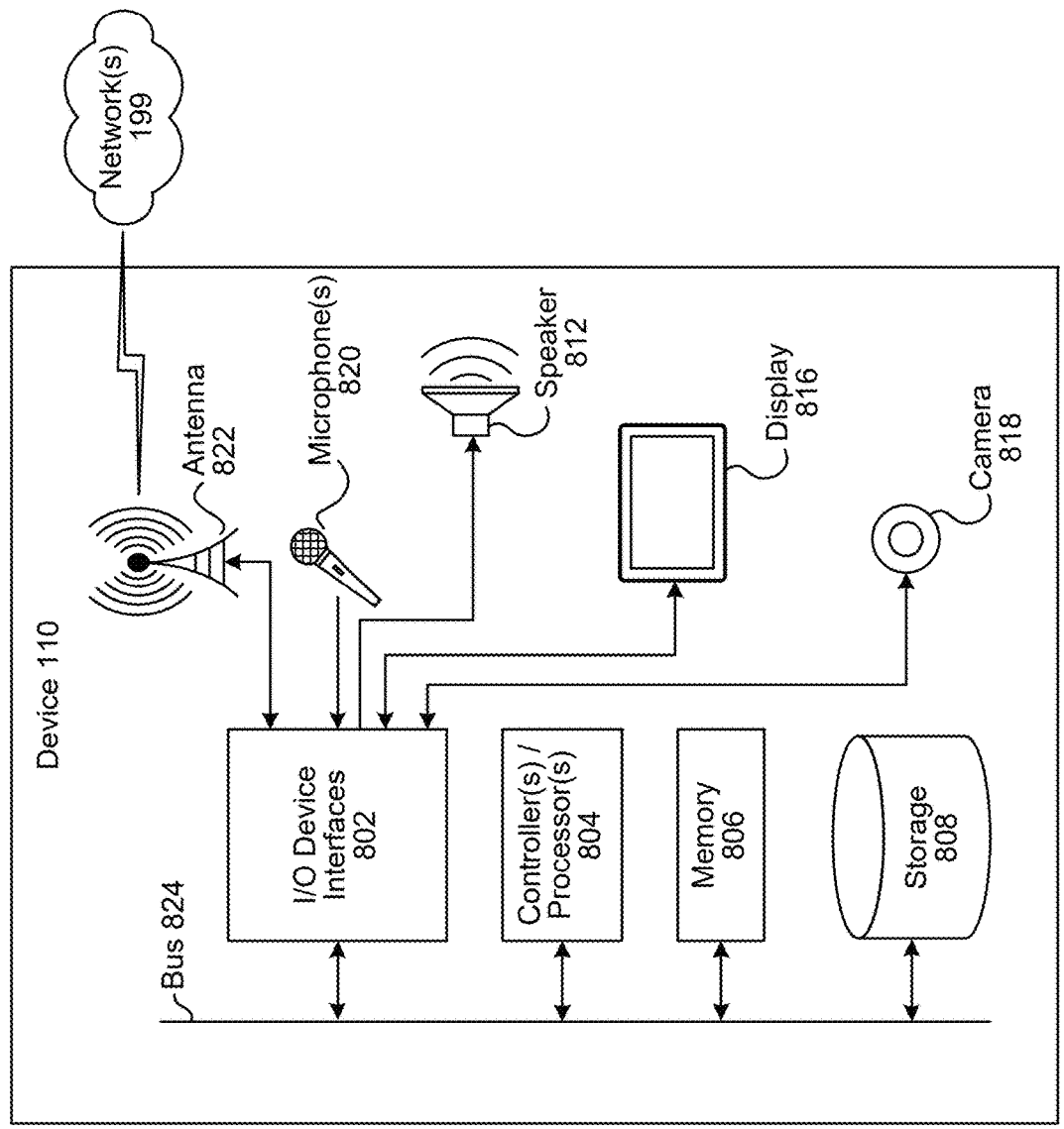
FIG. 8 is a block diagram conceptually illustrating example components of a user device, according to embodiments of the present disclosure.
Figure 9:
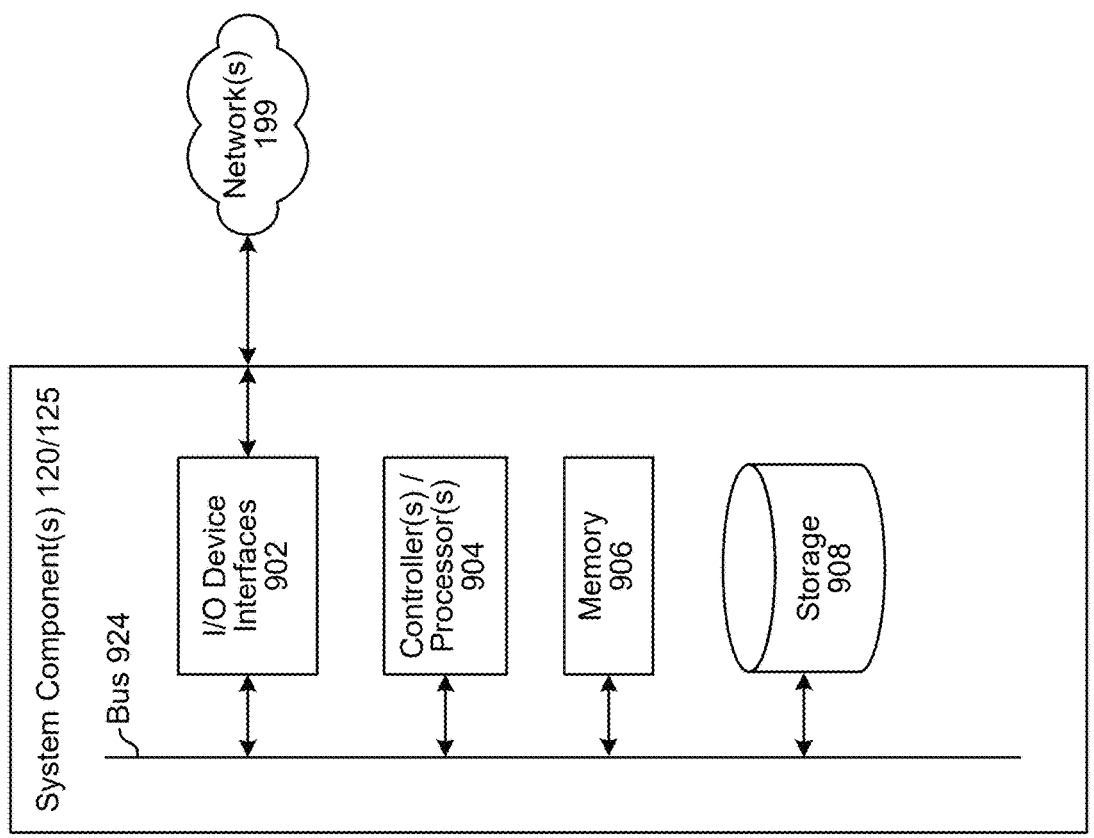
FIG. 9 is a block diagram conceptually illustrating example components of a system, according to embodiments of the present disclosure.

FIG. 8 is a block diagram conceptually illustrating a device 110 that may be used with the system. FIG. 9 is a block diagram conceptually illustrating example components of a remote device, such as the natural language command processing system component(s), which may assist with ASR processing, NLU processing, etc., and a skill system component(s) 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system component(s) may be located remotely from the device 110 as its operations may not require proximity to the user. The server/system component(s) may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). The supporting device 120 may also be a version of a user device 110 that includes different (e.g., more) processing capabilities than other user device(s) 110 in a home/office. One benefit to the server/system component(s) being in a user's home/business is that data used to process a command/return a response may be kept within the user's home, thus reducing potential privacy concerns.

Multiple system components (120/125) may be included in the overall system 100 of the present disclosure, such as one or more natural language processing system component(s) 120 for performing ASR processing, one or more natural language processing system component(s) 120 for performing NLU processing, one or more skill system component(s) 125, etc. In operation, each of these systems may include computer-readable and computer-executable instructions that reside on the respective device (120/125), as will be discussed further below.

Each of these devices (110/120/125) may include one or more controllers/processors (804/904), which may each include a central processing unit (CPU) for processing data and computer-readable instructions, and a memory (806/906) for storing data and instructions of the respective device. The memories (806/906) may individually include volatile random access memory (RAM), non-volatile read only memory (ROM), non-volatile magnetoresistive memory (MRAM), and/or other types of memory. Each device (110/120/125) may also include a data storage component (808/908) for storing data and controller/processor-executable instructions. Each data storage component (808/908) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (802/902).

Computer instructions for operating each device (110/120/125) and its various components may be executed by the respective device's controller(s)/processor(s) (804/904), using the memory (806/906) as temporary "working" storage at runtime. A device's computer instructions may be stored in a non-transitory manner in non-volatile memory (806/906), storage (808/908), or an external device(s). Alternatively, some or all of the executable instructions may be embedded in hardware or firmware on the respective device in addition to or instead of software.

Each device (110/120/125) includes input/output device interfaces (802/902). A variety of components may be connected through the input/output device interfaces (802/902), as will be discussed further below. Additionally, each device (110/120/125) may include an address/data bus (824/924) for conveying data among components of the respective device. Each component within a device (110/120/125) may also be directly connected to other components in addition to (or instead of) being connected to other components across the bus (824/924).

Referring to FIG. 8, the device 110 may include input/output device interfaces 802 that connect to a variety of components such as an audio output component such as a speaker 812, a wired headset or a wireless headset (not illustrated), or other component capable of outputting audio. The device 110 may also include an audio capture component. The audio capture component may be, for example, a microphone 820 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 816 for displaying content. The device 110 may further include a camera 818.

Via antenna(s) 822, the input/output device interfaces 802 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (802/902) may also include communication components that allow data to be exchanged between devices such as different physical servers in a collection of servers or other components.

The components of the device(s) 110, the natural language command processing system component(s), or a skill system component(s) 125 may include their own dedicated processors, memory, and/or storage. Alternatively, one or more of the components of the device(s) 110, the natural language command processing system component(s), or a skill system component(s) 125 may utilize the I/O interfaces (802/902), processor(s) (804/904), memory (806/906), and/or storage (808/908) of the device(s) 110, natural language command processing system component(s), or the skill system component(s) 125, respectively. Thus, the ASR component 450 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system component(s), and a skill system component(s) 125, as described herein, are illustrative, and may be located as a stand-alone device or may be included, in whole or in part, as a component of a larger device or system. As can be appreciated, a number of components may exist either on a system component(s) and/or on device 110. For example, language processing (which may include ASR 450), language output (which may include natural language generation (NLG) and TTS 456), etc., for example as illustrated in FIG. 4. Unless expressly noted otherwise, the system version of such components may operate similarly to the device version of such components and thus the description of one version (e.g., the system version or the local version) applies to the description of the other version (e.g., the local version or system version) and vice-versa.

Figure 10:
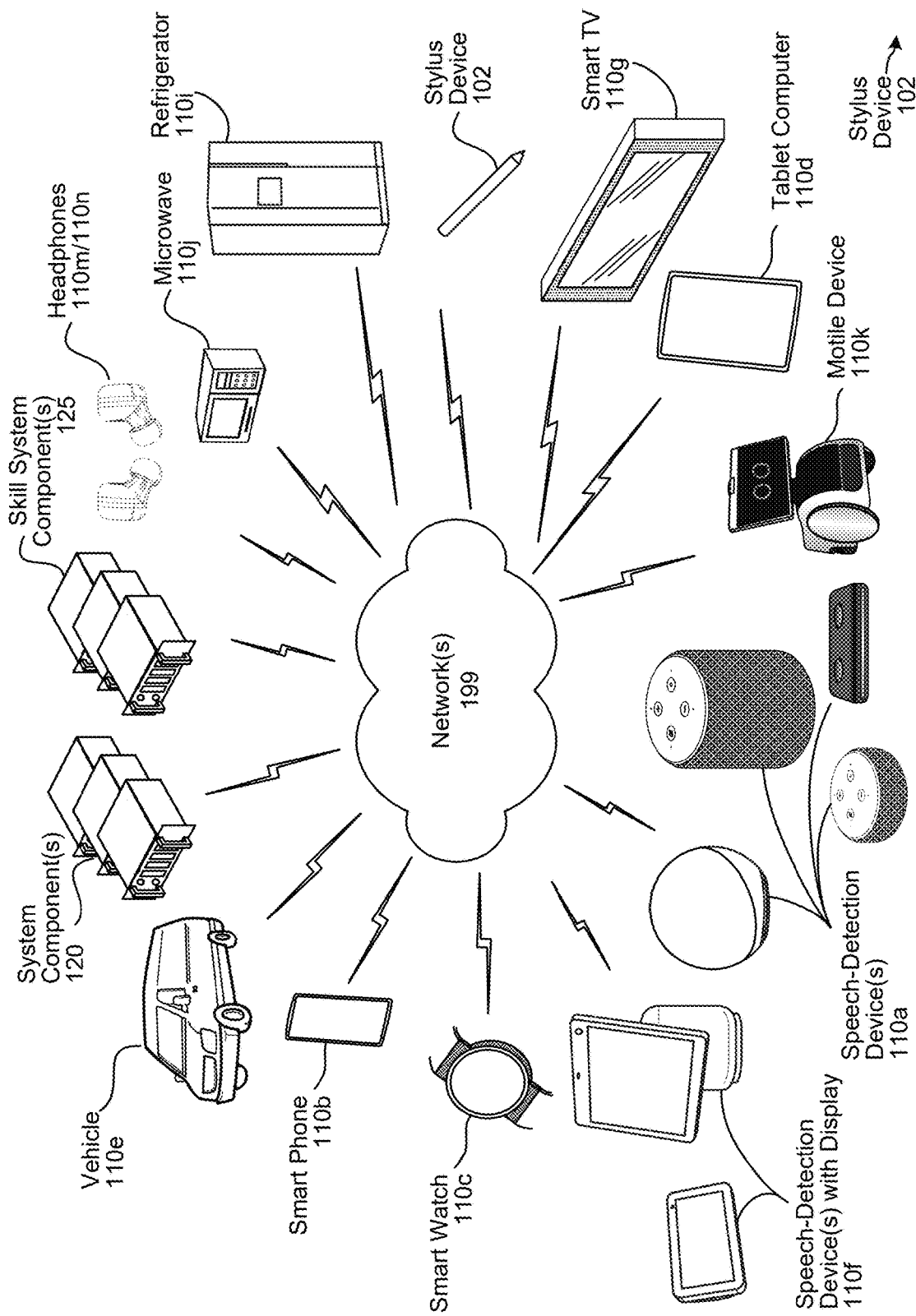
FIG. 10 illustrates an example of a computer network for use with the overall system, according to embodiments of the present disclosure.

As illustrated in FIG. 10, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a refrigerator 110i, a microwave 110j, autonomously motile device 110k (e.g., a robot), etc., may be connected to the network(s) 199 through a wireless service provider, over a Wi-Fi or cellular network connection, or the like. Other devices are included as network-connected support devices, such as the natural language command processing system component(s) 120, the skill system component(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 450, etc. of the natural language command processing system component(s) 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A stylus device, comprising:
   a body portion;
   a tip for contacting a surface;
   a light emitting component;
   a wireless communication component;
   at least one processor;
   at least one event sensor in communication with the at least one processor, the at least one event sensor configured to:
      receive, by pixels of the at least one event sensor, reflected light from a surface,
      for each respective pixel of the pixels, determine whether a change in light intensity detected at the respective pixel satisfies a threshold value, and
      for each respective pixel of the pixels, generate respective event data based on the change in light intensity satisfying the threshold value; and
   at least one memory component coupled to the at least one processor and including instructions that, when executed by the at least one processor, cause the at least one processor to:
      determine a mode of operation,
      in response to determining the mode of operation corresponds to image capture, cause the light emitting component to emit light and cause the light emitting component to modulate intensity of emitted light,
      in response to determining the mode of operation corresponds to handwriting motion tracking, cause the light emitting component to emit coherent light and refrain from causing the light emitting component to modulate intensity of the coherent light,
      receive, from the at least one event sensor, event data corresponding to the pixels, and
      perform, based on the mode of operation and using the event data, at least one of a handwriting motion tracking operation and/or an image capture operation.

2. The stylus device of claim 1, wherein the at least one memory component includes further instructions that, when executed by the at least one processor, further cause the at least one processor to:
   determine, based on the mode of operation and using event data, a direction of a handwriting motion;
   determine, based on the mode of operation and using event data, a velocity of the handwriting motion; and
   generate, based on the direction and the velocity, path data corresponding to a path of the handwriting motion.

3. The stylus device of claim 2, wherein the at least one memory component includes further instructions that, when executed by the at least one processor, further cause the at least one processor to:
   transmit the path data to a processing component;
   receive, from the processing component, text data corresponding to the handwriting motion; and
   cause the text data to be displayed on a screen of a first device communicatively coupled to the stylus device.

4. The stylus device of claim 2, wherein the at least one memory component includes further instructions that, when executed by the at least one processor, further cause the at least one processor to:
   generate, based on the path data, an image corresponding to the handwriting motion; and
   cause the image to be displayed on a screen of a first device.

5. The stylus device of claim 2, wherein the at least one memory component includes further instructions that, when executed by the at least one processor, further cause the at least one processor to:
   cause the path data to be processed into text data corresponding to the handwriting motion;
   cause the text data to be sent to a language processing component; and
   cause responsive data resulting from processing by the language processing component to be displayed on a screen of a first device.

6. The stylus device of claim 1, wherein the at least one memory component includes further instructions that, when executed by the at least one processor, further cause the at least one processor to:
   generate, based on the mode of operation and using event data, a plurality of binary images;
   cause the plurality of binary images to be sent to an image processing component; and
   cause first responsive data based on processing by the image processing component to be presented by a first device.

7. The stylus device of claim 6, wherein the at least one memory component includes further instructions that, when executed by the at least one processor, further cause the at least one processor to:
   cause the first responsive data to be sent to an object detection component; and
   cause second responsive data based on processing by the object detection component to be presented by the first device, wherein the second responsive data identifies one or more detected objects.

8. The stylus device of claim 6, wherein the at least one memory component includes further instructions that, when executed by the at least one processor, further cause the at least one processor to:
- cause data based on an output from the image processing component to be sent to a language processing component; and
- receive the first responsive data from the language processing component.

9. The stylus device of claim 1, wherein the at least one memory component includes further instructions that, when executed by the at least one processor, further cause the at least one processor to:
- determine data corresponding to pressure being applied on the tip; and
- determine the mode of operation corresponds to the handwriting motion tracking based on the data satisfying a threshold pressure value.

10. The stylus device of claim 1, wherein the at least one memory component includes further instructions that, when executed by the at least one processor, further cause the at least one processor to:
- receive audio data corresponding to a user input; and
- determine the mode of operation corresponds to the image capture in response to the user input.

11. The stylus device of claim 1, further comprising a flat lens proximal to the tip.

12. A computer-implemented method comprising:
determining a mode of operation of a stylus device;
performing one of: (1) in response to determining the mode of operation corresponds to image capture, causing a light emitting component of the stylus device to emit light and cause the light emitting component to modulate intensity of emitted light or (2) in response to determining the mode of operation corresponds to handwriting tracking, causing the light emitting component to emit coherent light and refrain from causing the light emitting component to modulate intensity of the coherent light;
receiving, over a first time period and by at least one or more pixels of at least one event sensor of the stylus device, reflected light from a surface, wherein the reflected light represents a speckle pattern;
for each pixel of the at least one or more pixels, determining whether a change in light intensity detected at a respective pixel, and based on the reflected light from the surface, satisfies a threshold value;
for each pixel of the at least one or more pixels, generating respective event data based on the change in light intensity satisfying the threshold value; and
performing, based on the respective event data, at least one of a handwriting motion tracking operation and/or an image capture operation.

13. The computer-implemented method of claim 12, further comprising:
- determining, based on the mode of operation and using the respective event data, a direction of a handwriting motion during the first time period;
- determining, based on the mode of operation and using the respective event data, a velocity of the handwriting motion during the first time period; and
- generating, based on the direction and the velocity, path data corresponding to a path of the handwriting motion.

14. The computer-implemented method of claim 13, further comprising:
- transmitting the path data to a processing component;
- receiving, from the processing component, text data corresponding to the handwriting motion; and
- causing the text data to be displayed on a screen of a first device communicatively coupled to the stylus device.

15. The computer-implemented method of claim 13, further comprising:
- generating, based on the path data, an image corresponding to the handwriting motion; and
- causing the image to be displayed on a screen of a first device.

16. The computer-implemented method of claim 13, further comprising:
- causing the path data to be processed into text data corresponding to the handwriting motion;
- causing the text data to be sent to a language processing component; and
- causing responsive data resulting from processing by the language processing component to be displayed on a screen of a first device.

17. The computer-implemented method of claim 12, further comprising:
- generating, based on the mode of operation and using the respective event data, a plurality of binary images during the first time period;
- causing the plurality of binary images to be sent to an image processing component; and
- causing first responsive data based on processing by the image processing component to be presented by a first device.

18. An electronic device comprising:
a tip;
a light emitting component;
an event camera;
one or more processors; and
one or more computer readable media storing processor executable instructions which, when executed using the one or more processors, cause the one or more processors to perform operations comprising:
transitioning to an image capture mode in response to user input;
while operating in the image capture mode:
- causing the light emitting component to emit light and causing the light emitting component to modulate intensity of emitted light, and
- generating, based on event data generated by the event camera that indicates a plurality of changes in light intensity at a plurality of pixels, first data representing a captured image;
transitioning to a handwriting capture mode in response to user input; and
while operating in the handwriting capture mode:
- causing the light emitting component to emit coherent light without modulating intensity of emitted light, and
- generating, based on event data generated by the event camera that indicates a plurality of changes in light intensity at a plurality of pixels, second data representing captured handwriting.

19. The electronic device of claim 18, wherein the electronic device is a stylus.

20. The electronic device of claim 18, wherein the electronic device is a pen and comprises ink.

* * * * *